United States Patent
Ye et al.

(10) Patent No.: US 9,924,166 B2
(45) Date of Patent: Mar. 20, 2018

(54) SAMPLING GRID INFORMATION FOR SPATIAL LAYERS IN MULTI-LAYER VIDEO CODING

(71) Applicant: VID SCALE, INC., Wilmington, DE (US)

(72) Inventors: Yan Ye, San Diego, CA (US); Yuwen He, San Diego, CA (US); Jie Dong, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 13/960,523

(22) Filed: Aug. 6, 2013

(65) Prior Publication Data

US 2014/0037015 A1 Feb. 6, 2014

Related U.S. Application Data

(60) Provisional application No. 61/680,244, filed on Aug. 6, 2012, provisional application No. 61/809,102, filed on Apr. 5, 2013.

(51) Int. Cl.
*H04N 7/12* (2006.01)
*H04N 19/85* (2014.01)
(Continued)

(52) U.S. Cl.
CPC ..... *H04N 19/00903* (2013.01); *H04N 19/186* (2014.11); *H04N 19/33* (2014.11);
(Continued)

(58) Field of Classification Search
CPC ....... H04N 19/00436; H04N 19/00763; H04N 19/00896; H04N 19/159; H04N 19/16;
(Continued)

(56) References Cited

U.S. PATENT DOCUMENTS

| 8,861,848 B2* | 10/2014 | Sato | G06T 9/004 |
| | | | 382/166 |
| 2006/0126962 A1* | 6/2006 | Sun | 382/268 |

(Continued)

FOREIGN PATENT DOCUMENTS

| JP | 2006-115340 A | 4/2006 |
| KR | 10-2006-0105407 A | 10/2006 |

(Continued)

OTHER PUBLICATIONS

ITU-T, "Transmission of Non-Telephone Signals—Information Technology—Generic Coding of Moving Pictures and Associated Audio Information: Video", ITU-T Recommendation H.262, Jul. 1995, 18 pages.

(Continued)

*Primary Examiner* — Gims Philippe
(74) *Attorney, Agent, or Firm* — Condo Roccia Koptiw LLP

(57) ABSTRACT

Sampling grid information may be determined for multi-layer video coding systems. The sampling grid information may be used to align the video layers of a coding system. Sampling grid correction may be performed based on the sampling grid information. The sampling grids may also be detected. In some embodiments, a sampling grid precision may also be detected and/or signaled.

13 Claims, 19 Drawing Sheets

(51) Int. Cl.
| | |
|---|---|
| *H04N 19/46* | (2014.01) |
| *H04N 19/186* | (2014.01) |
| *H04N 19/80* | (2014.01) |
| *H04N 19/33* | (2014.01) |
| *H04N 19/59* | (2014.01) |
| *H04N 19/597* | (2014.01) |

(52) U.S. Cl.
CPC ............ *H04N 19/46* (2014.11); *H04N 19/59* (2014.11); *H04N 19/80* (2014.11); *H04N 19/85* (2014.11); *H04N 19/597* (2014.11)

(58) Field of Classification Search
CPC ...... H04N 19/33; H04N 19/59; H04N 19/593; H04N 19/61; H04N 19/80; H04N 19/82; H04N 21/23427
USPC ............. 375/240.01–240.29; 382/238, 268; 348/43, 443, 458, 581
See application file for complete search history.

(56) References Cited

U.S. PATENT DOCUMENTS

| | | | |
|---|---|---|---|
| 2006/0222067 | A1 | 10/2006 | Park et al. |
| 2006/0222070 | A1 | 10/2006 | Park et al. |
| 2006/0268886 | A1 | 11/2006 | Sammour et al. |
| 2007/0160153 | A1* | 7/2007 | Sullivan .................. 375/240.29 |
| 2008/0008249 | A1 | 1/2008 | Yan |
| 2008/0253672 | A1* | 10/2008 | Segall ........................... 382/238 |
| 2013/0113884 | A1* | 5/2013 | Leontaris et al. .............. 348/43 |
| 2013/0301579 | A1 | 11/2013 | Zhang et al. |

FOREIGN PATENT DOCUMENTS

| | | |
|---|---|---|
| KR | 10-2009-0132640 A | 12/2009 |
| WO | WO 2011/090790 A1 | 7/2011 |

OTHER PUBLICATIONS

Alshina, E., et al., "Suggested up-sampling filter design for tool experiments on HEVC scalable extension", JCT-VC of ITU-T SG 16 WP 3 and ISO/IEC JTC1 1/SC 29/WG 11; 11th Meeting: Shanghai, CN, Oct. 2012, 3 pages.

Chujo, "Trends in Standardization of Next-Generation Video Coding (HEVC)", The Journal of the Institute of Image Information and Television Engineers, vol. 66, No. 6, Jun. 1, 2012, 9 pages.

J. Dong, et al., 'Downsampling filters for anchor generation for scalable extensions of HEVC,' ISO/IEC JTC1/SC29/WG11 MPEG2012/m24499, 100th MPEG meeting, Geneva, Switzerland, May 2012, 4 pages.

Kwon, et al., "Inter-layer texture prediction for bit-depth and chroma format scalability", JCT-VC of ITU-T SG 16 WP 3 and ISO/IEC JTC1/SC 29/WG 11; 12th Meeting: Geneva, CH, Jan. 14-23, 2013, 12 pages.

McCann, K., et al., "Samsung's Response to the Call for Proposals on Video Compression Technology", JCT-VC of ITU-T SG16 WP3 and ISO/IEC JTC1/SC29/WG11; 1st Meeting: Dresden, DE.

"Information Technology—Generic Coding of Moving Pictures and Associated Audio Information: Video", Series H: AudioVisual and Multimedia Systems, Infrastructure of AudioVisual Services—Coding of Moving Video, Telecommunication Standardization Sector of ITU (ITU-T), International Telecommunication Union (ITU), H.262, ISO/IEC 13818 (E), Feb. 2000, 83-92.

Dong et al., "Upsampling Based on Sampling Grid Information for Aligned Inter Layer Prediction", InterDigital Communications Inc., Joint Collaborative Team on Video Coding (JCT-VC) of ITU-T SG 16 WP 3 and ISO/IEC JTC 1/SC 29/WG 11, JCTVC-M0188r1, 13th Meeting: Incheon, KR, Apr. 18-26, 2013, 1-11.

Guo et al. "Signaling of Phase Offset in Up-sampling Process and Chroma Sampling Location", Qualcomm Incorporated, InterDigital Communications, Inc., Nokia, Joint Collaborative Team on Video Coding (JCT-VC) of ITU-T SG 16 WP 3 and ISO/IEC JTC 1/SC 29/WG 11, JCTVC-M0465, 13th Meeting: Incheon, KR, Apr. 18-26, 2013, 1-8.

Park et al., "Intra BL Prediction Considering Phase Shift", LG Electronics Inc., Joint Video Team (JVT) of ISO/IEC MPEG & ITU-T VCEG (ISO/IEC JTC1/SC29/WG11 and ITU-T SG16 Q.6), JVT-O023, 15th Meeting: Busan, KR, Apr. 16-22, 2005, 1-16.

Sun et al., "Extended Spatial Scalability with Picture-Level Adaptation", Sharp and Thomson, Joint Video Team (JVT) of ISO/IEC MPEG & ITU-T VCEG (ISO/IEC JTC1/SC29/WG11 and ITU-T SG16 Q.6), JVT-O008, 15th Meeting: Busan, KR, Apr. 16-22, 2005, 1-20.

ITU, "Codec for Audiovisual Services At n×384 kbit/s", Series H: AudioVisual and Multimedia Systems, Coding of Moving Video, Telecommunication Standardization Sector of ITU (ITU-T), International Telecommunication Union (ITU), Rec H.261, Nov. 1988, 1-14.

ISO/IEC, "Information Technology—Coding of moving pictures and associated audio for digital storage media at up to about 1,5 Mbit/s", International Standards ISO/IEC 11172-2:1993—Part 2: Video, 1993, 1-6.

ITU, "Video Coding for Low Bit Rate Communication", Transmission of Non-Telephone Signals, International Telecommunication Union (ITU), H.263, Mar. 1996, 1-52.

ISO/IEC, "Information Technology—Coding of Audio-Visual Objects", International Standard, Part2: Visual, ISO/IEC 14496-2, Dec. 2001, 1-536.

"Advanced Video Coding for Generic Audiovisual Services", Series H: AudioVisual and Multimedia Systems, Infrastructure of AudioVisual Services—Coding of Moving Video, Telecommunication Standardization Sector of ITU (ITU-T), International Telecommunication Union (ITU), H.264, Nov. 2007, 1-564.

Bross et al., "High Efficiency Video Coding (HEVC) Text Specification draft 7", Joint Collaborative Team on Video Coding (JCT-VC) of ITU-T SG16 WP3 and ISO/IEC JTC1/SC29/WG11 9th Meeting: Geneva, CH, Apr. 27-May 7, 2012, 1-273.

Luthra et. at., "Draft Call for Proposals on the Scalable Video Coding Extensions of HEVC", WG11 AHG on Study of HEVC Extensions, ISO/IEC JTC1/SC29/WG11 M24482 Apr. 2012, Geneva, Switzerland, 1-11.

Jens-Rainer, "Advances in Scalable Video Coding", IEEE, vol. 93, No. 1, Jan. 2005, 1-15.

Chen et al., "SHVC Test Model 1 (SHM 1)", Joint Collaborative Team on Video Coding (JCT-VC) of ITU-T SG16 WP3 and ISO/IEC JTC1/SC29/WG11, JCTVC-L1007_v3, 12th Meeting: Geneva, CH, Jan. 14-23, 2013, 1-41.

Chen et al., "SHVC Draft Text 1", Joint Collaborative Team on Video Coding (JCT-VC) of ITU-T SG16 WP3 and ISO/IEC JTC1/SC29/WG11, JCTVC-L1008, 12th Meeting: Geneva, CH, Jan. 14-23, 2013.

JCT-VC of ITU-T SG 16 WP3 and ISO/IEC JTC1/SC29/WG11 "Suggested design of initial software model for scalable HEVC extension proposal by Frauhofer HHI, Vidyo and Samsung", JCTVC-K0345r3, Oct. 2012, 22 pages.

Matsuo, "In-Loop Filter of Video Coding", vol. 67, issue 3, 2013, 4 pages.

Ono, Ubiquitous Technology: High Efficiency Encoding of Dynamic Images—MPEG-4 and H.264, Japan, Ohmsha Ltd., ISBN: 4-274-20060-4, Apr. 2005, 4 pages.

\* cited by examiner

   
   
   
   
FIG. 5A

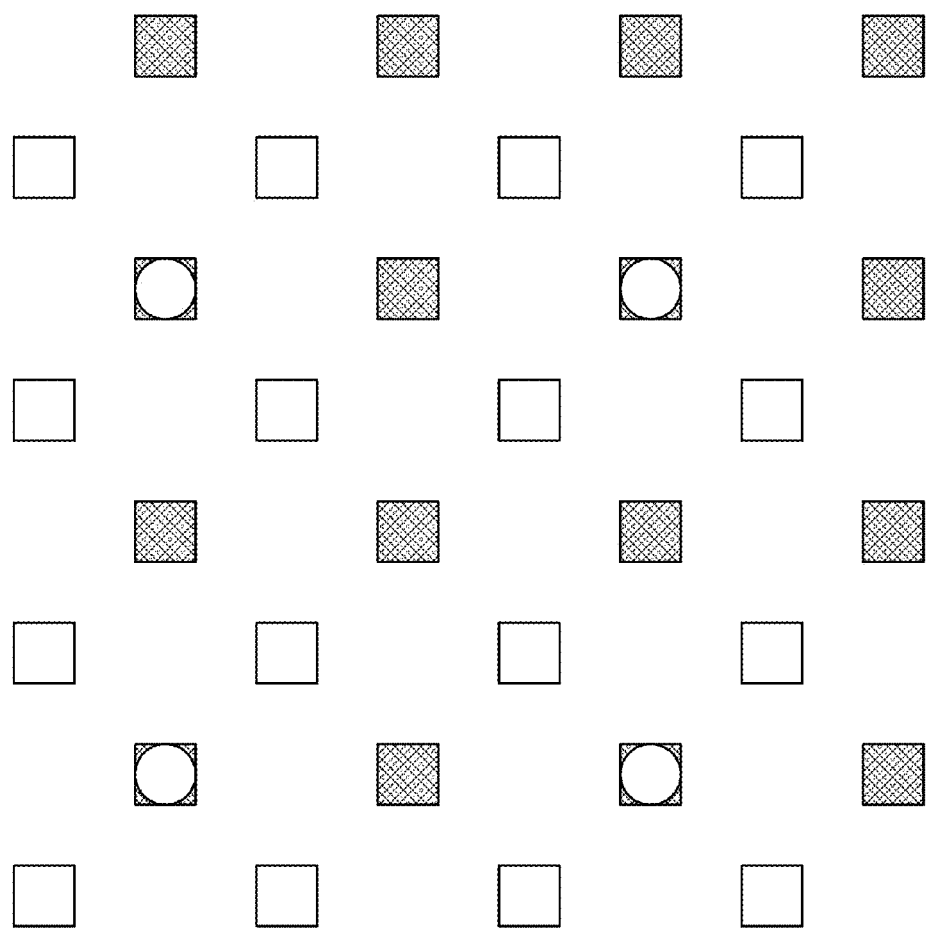

SAMPLING GRID INFORMATION FOR SPATIAL LAYERS IN MULTI-LAYER VIDEO CODING

CROSS-REFERENCE TO RELATED APPLICATIONS

This application claims the benefit of U.S. Provisional Patent Application No. 61/680,244, filed Aug. 6, 2012, titled "Signaling Of Sampling Grid Information Among Spatial Layers In Multi-Layer Video", and U.S. Provisional Patent Application No. 61/809,102, filed Apr. 5, 2013, titled "Signaling Of Sampling Grid Information Among Spatial Layers In Multi-Layer Video Coding", the disclosures of both applications being herby incorporated by reference herein in their respective entirety, for all purposes.

BACKGROUND

As video applications are being implemented on smartphones and other WTRUs, video consumption may be accommodated on devices with widely varying capabilities (e.g., in terms of computing power, memory/storage size, display resolution, display frame rate, etc.). The network and/or transmission channels may also have widely varying characteristics (e.g., in terms of packet loss rate, available channel bandwidth, burst error rate, etc.). Moreover, the video data may be transmitted over wired networks and/or wireless networks. The various configurations of these devices and/or network entities may complicate the transmission and/or coding of the video data.

SUMMARY

Systems, methods, and apparatuses are described herein for signaling sampling grid information in a multi-layer video coding system. For example, sampling grid information may be received that may indicate at least a degree (or amount) of sampling grid alignment between a first video layer and a second video layer. A sampling grid associated with the first video layer may be offset according to the received sampling grid information to align with a sampling grid associated with the second video layer.

In one or more embodiments, sampling grid correction may be performed based on sampling grid information.

In one or more embodiments, the sampling grids may be detected.

Embodiments contemplate one or more techniques for sampling grid correction for multi-layer video coding. Techniques may include receiving sampling grid information that may indicate a sampling grid alignment between a first video layer and a second video layer. Techniques may also include aligning a sampling grid associated with the first video layer with a sampling grid associated with the second video layer. The aligning may be based on the received sampling grid information.

Embodiments contemplate one or more techniques for communicating sampling grid information for multi-layer video coding. Techniques may include receiving a first data (e.g., a data set or data). Techniques may also include determining if the first data includes the sampling grid information. Techniques may also include determining a precision of the sampling grid information upon the first data being determined to include the sampling grid information.

Embodiments contemplate one or more techniques for detection of a relative sampling grid for one or more layers in multi-layer video coding. Techniques may include upsampling a base layer to match an enhancement layer spatial resolution. Techniques may also include applying adaptive filter training to the upsampled base layer and the enhancement layer. Techniques may also include determining a position of the relative sampling grid based on one or more adaptive filter coefficients from the adaptive filter training.

BRIEF DESCRIPTION OF THE DRAWINGS

FIG. 7 shows an example of a misaligned (or mismatched) sampling grid between an EL video and an up-sampled BL video after down-sampling and up-sampling (e.g., 2× spatial ratio, non-zero phase shift down-sampling and zero phase shift up-sampling), consistent with embodiments.

DETAILED DESCRIPTION

Figure 1:
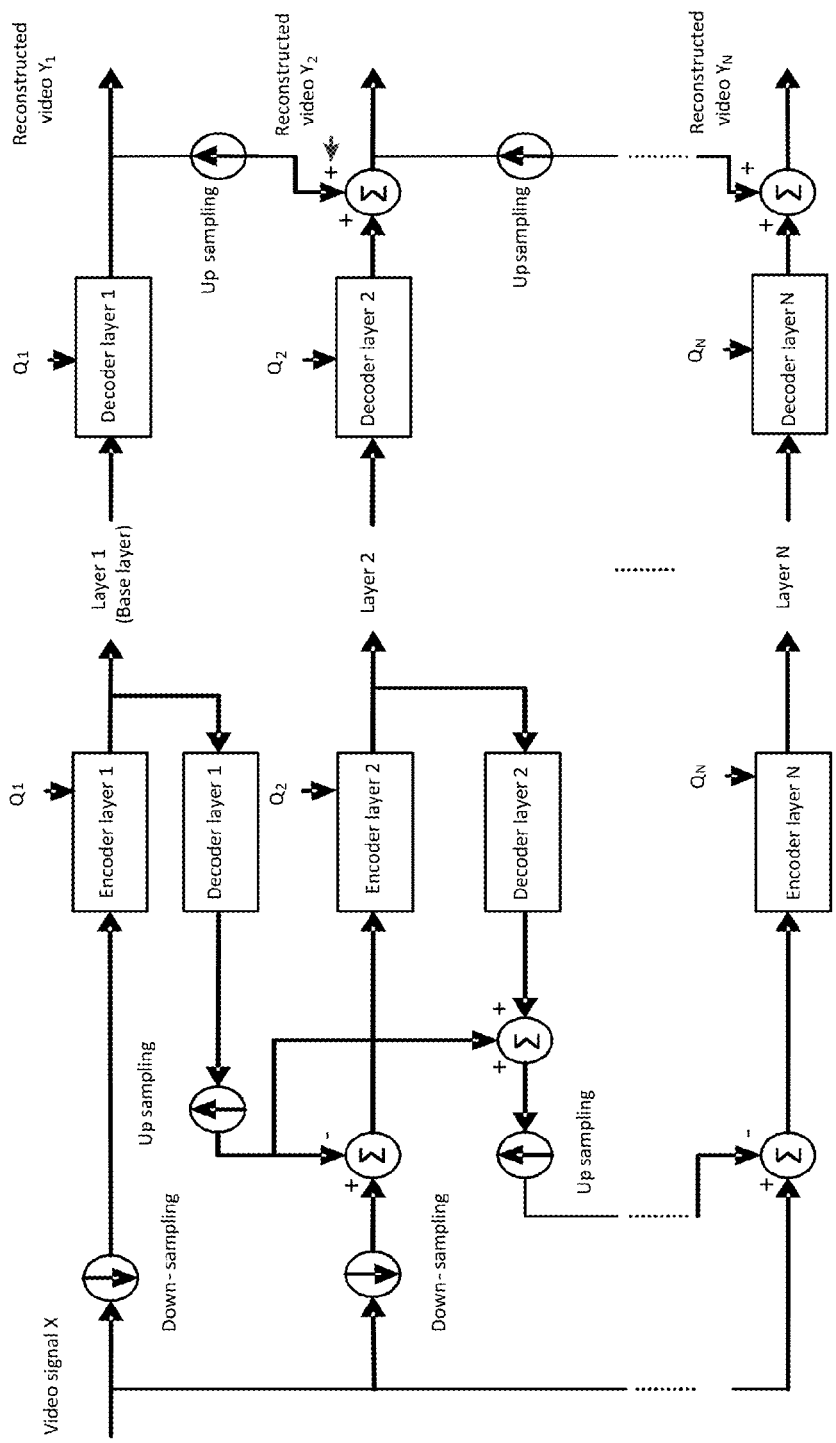
FIG. 1 shows a block diagram of an example block-based hybrid scalable video encoding system with N layers, consistent with embodiments.

A detailed description of illustrative embodiments will now be described with reference to the various Figures. Although this description provides a detailed example of possible implementations, it should be noted that the details are intended to be exemplary and in no way limit the scope of the application. As used herein, the article "a" or "an", absent further qualification or characterization, may be understood to mean "one or more" or "at least one", for example.

Various digital video compression technologies may be used to enable efficient digital video communication, distribution, and/or consumption. Examples of commercially deployed standards for such digital video may be developed by ISO/IEC and ITU-T, such as H.26, MPEG-1, MPEG-2, H.263, MPEG-4 part 2, H.264/MPEG-4 part 10 AVC, and/or High Efficiency Video Coding (HEVC) (e.g., which may be jointly developed by ITU-T Video Coding Experts Group (VCEG) and ISO/IEC Moving Picture Experts Group (MPEG)). HEVC may be used to achieve greater compression (e.g., twice as much compression as H.264/AVC), and/or less bit rate (e.g., half the bit rate) in the same, or similar, video quality.

Digital video services may be implemented via TV services over satellite, cable, terrestrial broadcasting channels, the internet (e.g., on mobile devices, such as smart phones, tablets, and/or other WTRUs) and/or other video applications, such as video chat, mobile video recording and sharing, and/or video streaming for example. These video transmissions may be performed in heterogeneous environments. In various types of video transmission scenarios, such as 3-screen or N-screen, various consumer devices (e.g., PCs, smart phones, tablets, TVs, etc.) may accommodate video consumption with widely varying capabilities (e.g., in terms of computing power, memory/storage size, display resolution, display frame rate, etc.). The network and/or transmission channels may have widely varying characteristics (e.g., in terms of packet loss rate, available channel bandwidth, burst error rate, etc.). Video data may be transmitted over a combination of wired networks and/or wireless networks, which may complicate the underlying transmission channel characteristics. In such scenarios, among others, the premise of scalable video coding (SVC) may be used to improve the quality of experience for video applications running on devices with different capabilities over heterogeneous networks.

SVC may be used to encode the signal (e.g., in some embodiments perhaps once) at a highest representation (e.g., temporal resolution, spatial resolution, quality, etc.). SVC may enable decoding from subsets of the video streams depending on the rate and/or representation implemented by applications running on a client device. SVC may save bandwidth and/or storage compared to non-scalable solutions. The international video standards MPEG-2 Video, H.263, MPEG4 Visual and H.264 may have tools and/or profiles that may support at least some modes of scalability.

FIG. 1 shows a block diagram of an example block-based hybrid scalable video encoding system. As illustrated in FIG. 1, the scalable video encoding system may include a number of layers (e.g., 1-N layers). The spatial/temporal signal resolution to be represented by the layer 1 (e.g., the base layer) may be generated by down-sampling of the input video signal. In a subsequent encoding stage, an appropriate setting of the quantizer ($Q_1$) may lead to a quality level of the base information. To encode (e.g., efficiently encode) the subsequent higher layers, the base-layer reconstruction $Y_1$, an approximation of the higher layer resolution levels, may be utilized in the encoding/decoding of the subsequent layers. The base layer reconstruction $Y_1$ may be upsampled to layer-2's resolution, for example by an up-sampling unit. Down-sampling and/or up-sampling may be performed throughout the various layers (e.g., layers 1, 2 . . . N). The down-sampling and/or up-sampling ratios may be different, perhaps in some embodiments depending on the relative dimensions between the two given layers (e.g., n1 and n2), among other factors. The video signals represented by the two layers may have the same, or similar, spatial resolution. In some embodiments the corresponding down-sampling and/or up-sampling operations may be by-passed.

In the example scalable system shown in FIG. 1, for any given higher layer n (e.g., $2 \le n \le N$), a differential signal may be generated by subtracting an up-sampled lower layer signal (e.g., layer n−1 signal) from the current layer n signal, and the difference signal thus obtained may be encoded. In some embodiments, coding of a difference signal as implemented in FIG. 1 may make it difficult to achieve good coding efficiency and/or avoid potential visual artifacts at the same time. To normalize the difference signal's dynamic range, non-linear quantization and/or joint quantization and normalization may be used. In some embodiments, these processes may introduce visual artifacts that may be difficult to avoid. In some embodiments, scalable video coding (e.g., as may be implemented in video coding standards, such as the Scalable Video Coding (SVC) and/or the Multi-View Coding (MVC) of the H.264 standard) might not use residual based inter-layer prediction. Instead, in some embodiments, inter-layer prediction based directly on decoded pictures of other layers may be used.

Figure 2:
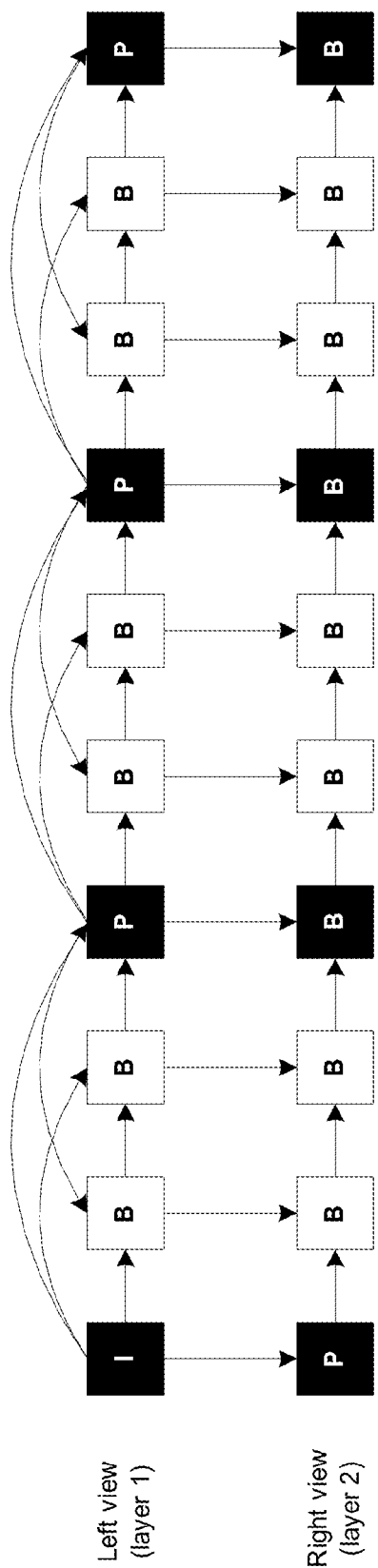
FIG. 2 shows a diagram of an example of temporal and inter-layer prediction for stereoscopic (2-view) video coding using H.264/MVC, consistent with embodiments.

FIG. 2 shows an example of temporal and inter-layer prediction for stereoscopic (2-view) video coding using a left view (layer 1) and a right view (layer 2). As illustrated in FIG. 2, an example structure may use MVC to code a stereoscopic video with left view (layer 1) and right view (layer 2). The left view video may be coded with IBBP prediction structure, while the right view video may be coded with PBBB prediction structure. In the right view (layer 2), the first picture collocated with the first I picture in the left view (layer 1) may be coded as a P picture, perhaps for example based on predicting from the I picture in layer 1. The other pictures in the right view may be coded as B pictures, with the first prediction coming from temporal references in the same layer (e.g., the right view), and/or the second prediction coming from inter-layer reference pictures in the layer 1 (e.g., the left view), for example.

While FIG. 2 shows an example of view scalability, a scalable system may support other types of scalabilities. Table 1 illustrates several types of scalabilities and example standards that may support them. Described herein are one or more embodiments for spatial scalability (e.g., where the spatial resolutions of two layers may be different). One or more embodiments are also described herein for the coding efficiency of a scalable system that may incorporate spatial scalability.

TABLE 1

Examples of different types of scalabilities

| Scalability | Example | Standards |
| --- | --- | --- |
| View scalability | 2D→3D (2 or more views) | MVC, MFC, 3DV |
| Spatial scalability | 720p→1080p | SVC, scalable HEVC |
| Quality (SNR) scalability | 35 dB→38 dB | SVC, scalable HEVC |
| Temporal scalability | 30fps→60fps | H.264/AVC, SVC, scalable HEVC |
| Standards scalability | H.264/AVC→HEVC | 3DV, scalable HEVC |
| Bit-depth scalability | 8-bit video → 10-bit video | Scalable HEVC* |
| Chroma format scalability | YUV4:2:0→YUV4:2:2, YUV4:4:4 | Scalable HEVC* |
| Aspect ratio scalability | 4:3→16:9 | Scalable HEVC* |

*might not be planned in the first phase of scalable HEVC standardization

Figure 3:
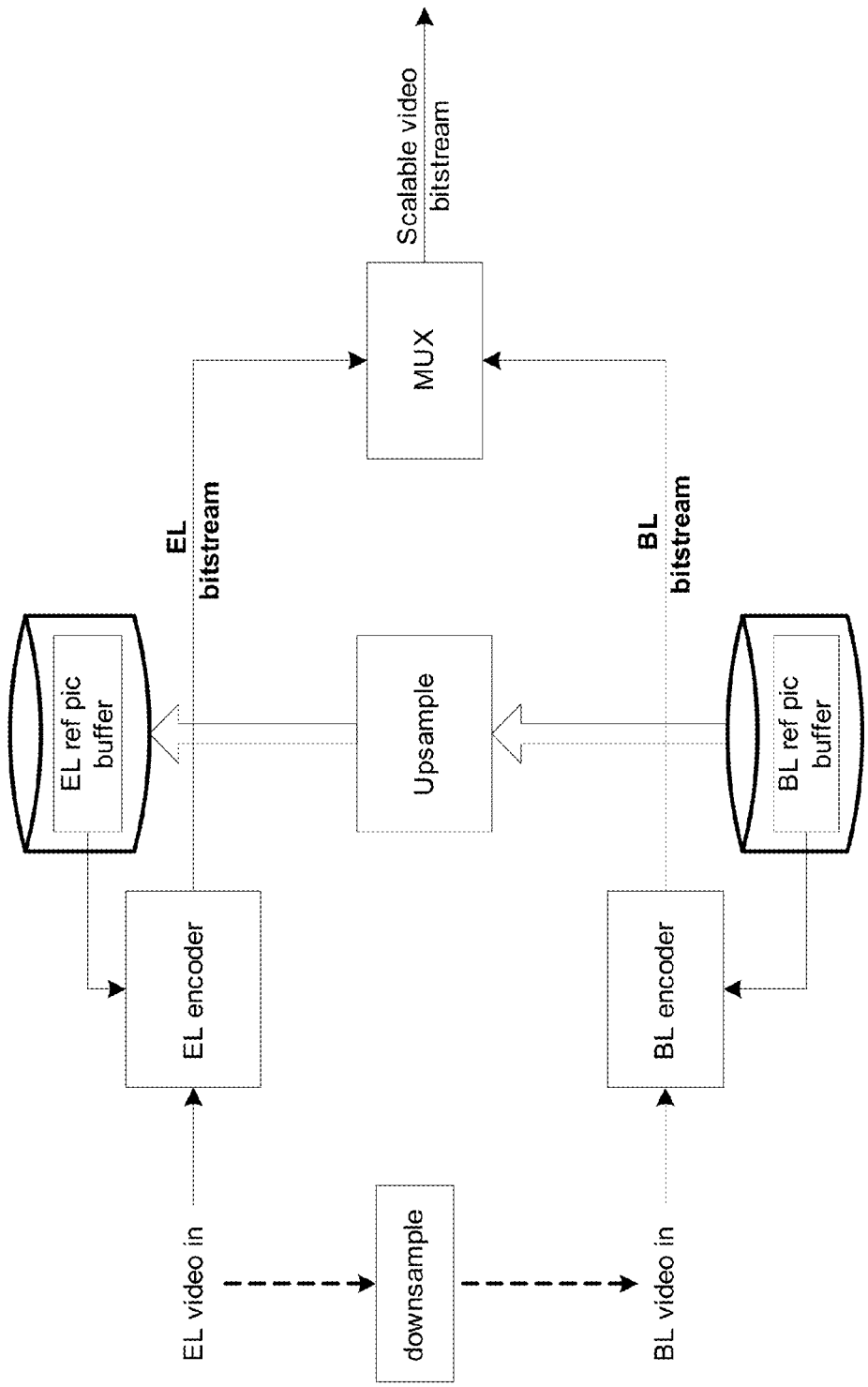
FIG. 3 shows a block diagram of an example spatial scalable multi-layer (e.g., 2 layer) encoding system, consistent with embodiments.
Figure 4:
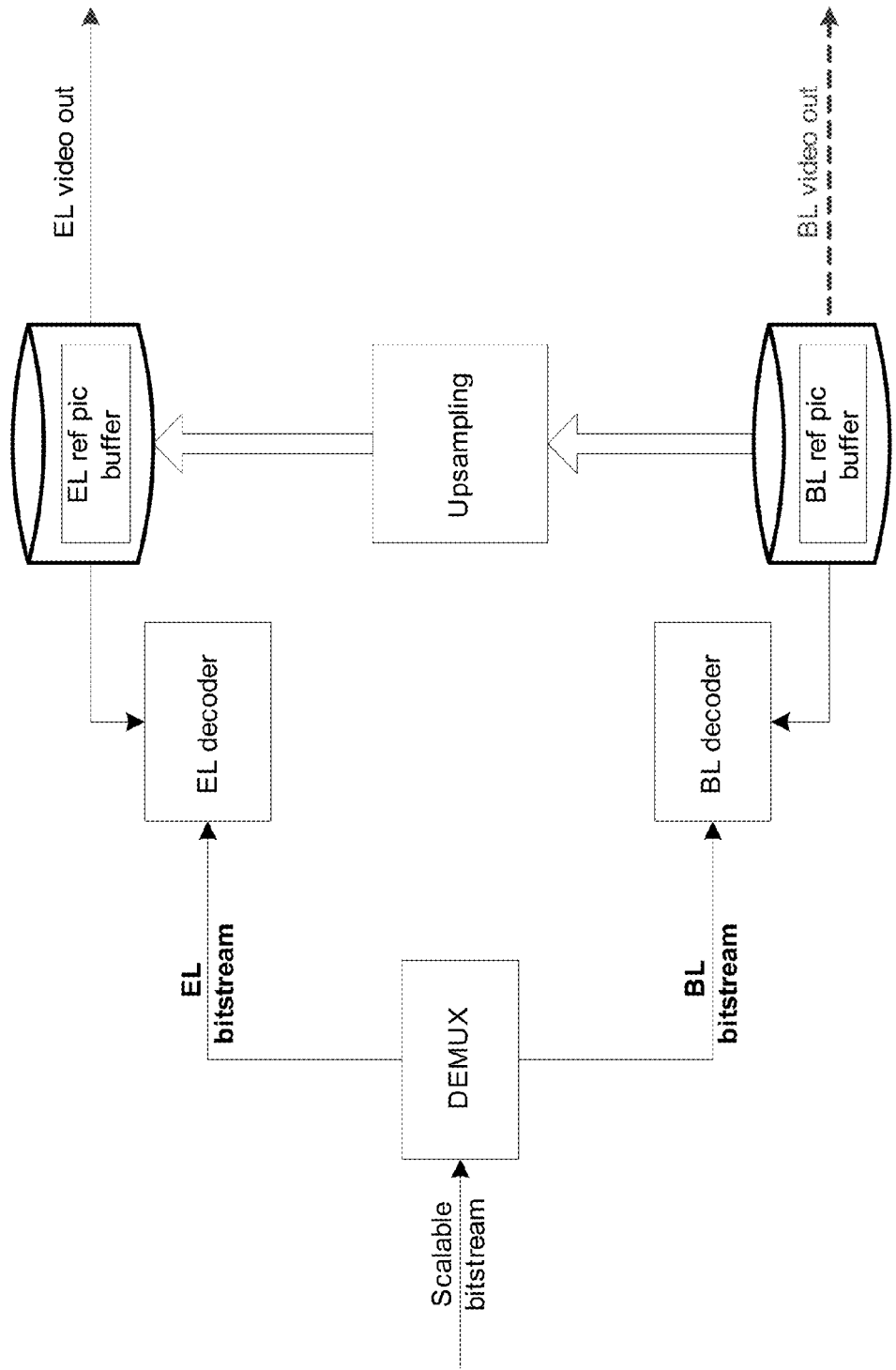
FIG. 4 shows a block diagram of an example spatial scalable multi-layer (e.g., 2 layer) decoder, consistent with embodiments.

FIG. 3 shows an example 2-layer encoding system that may support spatial scalability. As shown, the base layer (BL) video input and the enhancement layer (EL) video input may be correlated with a down-sampling process. The BL video may be encoded by the BL encoder. The EL video may be encoded by the EL encoder. The reconstructed BL video signal, which may be stored in the BL reference picture buffer for example, may be up-sampled to match the EL video resolution and/or used by the EL encoder to efficiently encode and/or predict the EL video input. The up-sampling process illustrated in FIG. 3 may be applied at the picture level (e.g., the entire BL picture may be up-sampled), at the region level (e.g., portions of the BL picture may be up-sampled), and/or at the block level (e.g., some blocks in the BL picture may be up-sampled). After encoding, the video packets of the BL bit-stream and/or the EL bit-stream may be multiplexed together to form the scalable bit-stream. FIG. 4 shows an example spatial scalable decoder (e.g., with 2 layers) that in some embodiment may correspond to the encoder in FIG. 3.

In some embodiments, a scalable coding system may mandate the up-sampling process, e.g., common to the encoder in FIG. 3 and/or the decoder in FIG. 4, perhaps to ensure bit exactness between the encoder and decoder, among other reasons. The down-sampling process in FIG. 3 may be a pre-processing step and/or might not be mandated by any scalable coding standard. The encoder may be allowed the freedom to determine the frequency characteristics and/or the relative sampling grid when designing the down-sampling filters that may be used in down-sampling. As described herein, in some embodiments, the encoder may choose to apply a down-sampling process that, perhaps when combined with the up-sampling process that may be mandated by the scalable coding system, might not produce a sampling grid that is fully aligned with the EL video signal. Consequently, the scalable coding performance may be negatively impacted. One or more embodiments are described herein for recovering the sampling grid of the EL video. For example, the sampling grid of the EL video may be recovered by signaling the sampling grid information as part of the scalable bit-stream and/or aligning the sampling grids between the spatial layers, perhaps based on the sampling grid information, among other factors.

Figure 5B:
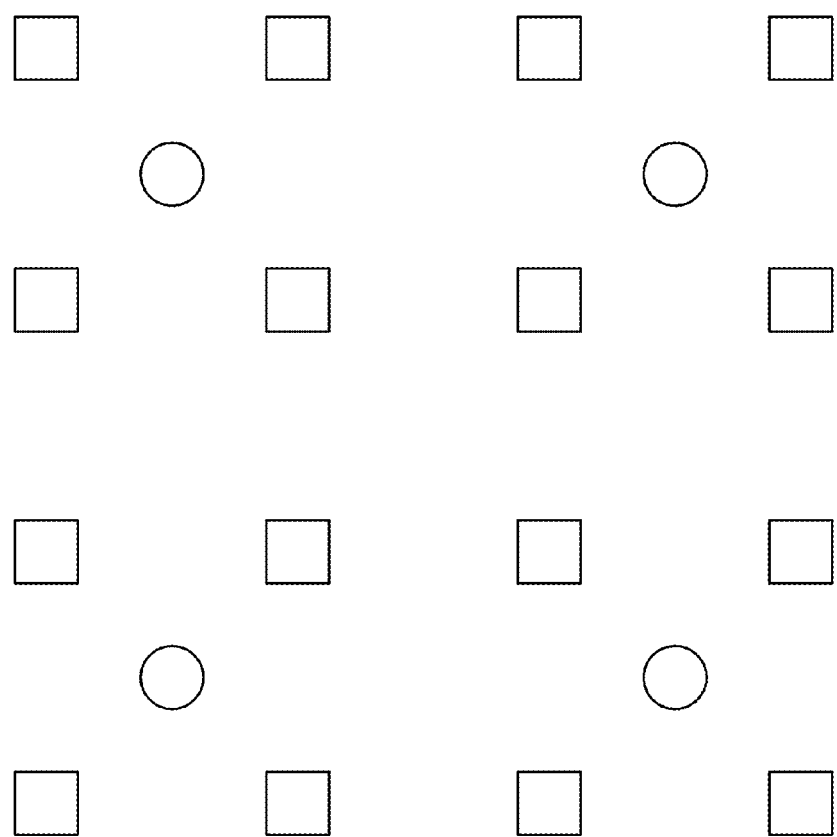
FIGS. 5A (e.g., zero phase shift) and 5B (e.g., non-zero phase shift) show examples of a sampling grid between a BL video and an EL video for a down-sampling ratio (e.g., 2×, each dimension), consistent with embodiments.
Figure 6A:
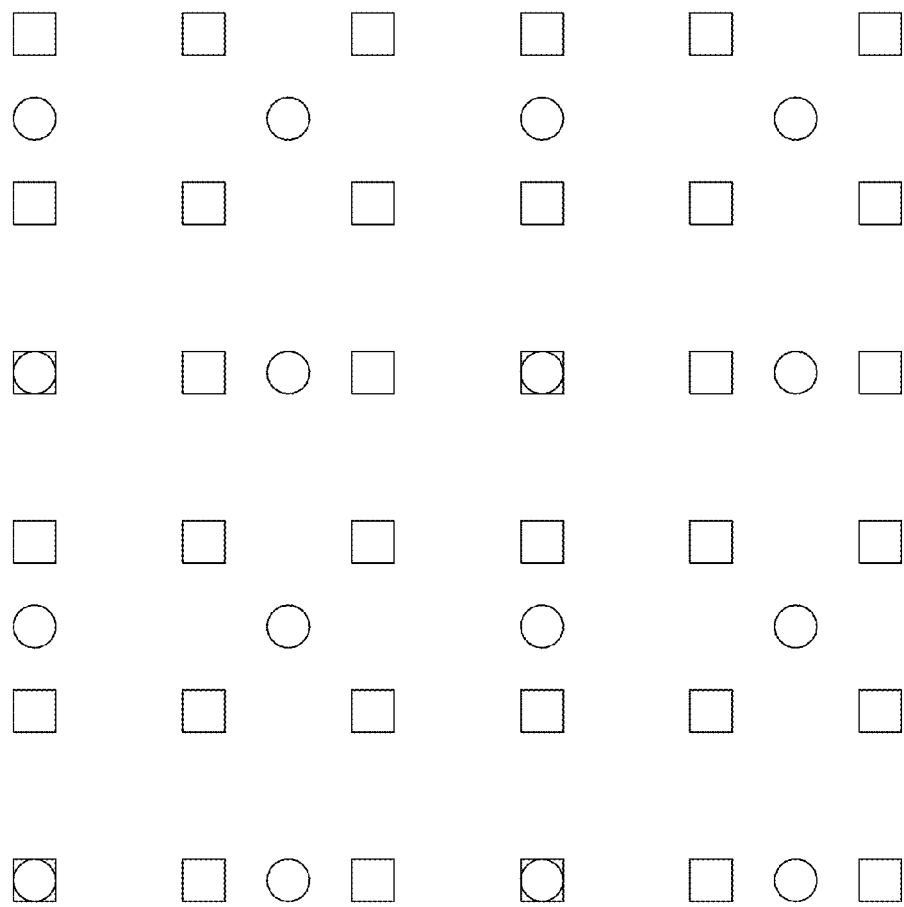
FIGS. 6A (e.g., zero phase shift) and 6B (e.g., non-zero phase shift) show other examples of a sampling grid between a BL video and an EL video for a down-sampling spatial ratio (e.g., 1.5×, each dimension), consistent with embodiments.
Figure 6B:
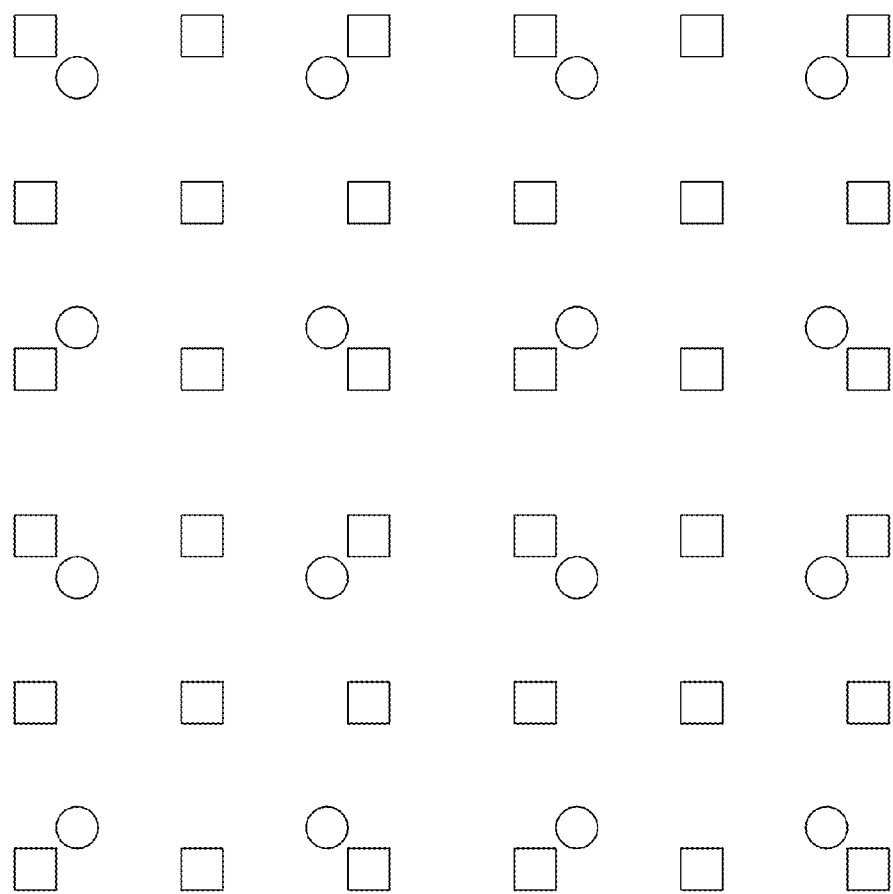

FIGS. 5A, 5B, 6A, and 6B illustrate examples of sampling grids between the BL video (e.g., circle) and the EL video (e.g., empty square) for two down-sampling ratios, 2× and 1.5×. For each spatial ratio, two exemplar sampling grids are given, one with zero phase shift (in FIG. 5A and FIG. 6A), and the other with non-zero phase shift (FIG. 5B and FIG. 6B). The up-sampling filter may ensure bit exactness between the encoder and the decoder. The specified up-sampling filter may assume a fixed sampling grid between the two spatial layers during down-sampling. The development of the scalable extension (e.g., of the HEVC standard) may use test video sequences generated using zero phase shift down-sampling filters. As a result, the up-sampling filters (e.g., specified in the scalable extension of HEVC) may be zero phase shift up-sampling filters so that the up-sampled BL video may be phase aligned with the EL video.

Encoder applications may choose to apply different down-sampling filters. For example, they may choose to apply down-sampling filters with non-zero phase shifts. Using an example of 2× spatial ratio between the BL and the EL video, a down-sampling filter with non-zero phase shift, and an up-sampling filter with zero phase shift, FIG. 7 gives an example of a misaligned sampling grid between the EL video and the up-sampled BL video. In FIG. 7, the original EL video is shown in empty squares. Perhaps after a non-zero phase shift down-sampling filter may be applied, among other techniques, a sampling grid of the down-sampled BL video is shown in circles. Perhaps after a zero phase shift up-sampling filter may be applied to the BL video, among other techniques, the sampling grid of the up-sampled video is shown in patterned squares. In some embodiments, perhaps when the up-sampled video that exhibits such misalignment in sampling grids may be used to predict the EL video, according to FIG. 3 and/or FIG. 4 for example (among other techniques), coding efficiency of the enhancement layer video in terms of rate-distortion performance may be negatively impacted. Embodiments contemplate that perhaps while motion estimation with fractional pixel precision may be used for compensation, the impact on coding performance might not be fully addressed due to one or more of the reasons described herein.

For example, some blocks in the EL video may be predicted using intra prediction from base layer, such as using the base layer intra skip mode in H.264/SVC for example, where motion vectors might not be sent. The video coding may support up to one-fourth pixel motion vector precision for one or more luma components and/or corresponding precision for one or more chroma components, for example. In some embodiments, perhaps if the sampling grids may be misaligned by other finer fractions (e.g., misaligned by one-eighth pixels), among other reasons, fractional motion compensation might not be used. The video coding may support motion vector prediction, where block motion vectors may be predicted from their neighboring blocks. In some embodiments, perhaps if a block in the EL video may be predicted from up-sampled BL video and/or may suffer from the misaligned sampling grid problem, and/or its neighbors may be predicted from temporal reference and/or might not suffer from the misaligned sampling grid problem, or vice versa, among other reasons, motion vector prediction accuracy may be reduced.

One or more embodiments described herein may be implemented to signal sampling grid information. For example, the amount (or degree) of sampling grid misalignment may be signaled. Corrections may be made to the misaligned sampling grids, perhaps based on the signaled sampling grid information, among other factors, for example.

The encoder may choose the down-sampling filters. The up-sampling filters in the scalable system may be predetermined and/or fixed. The down-sampling filters may be chosen and/or fixed at a high level, e.g., at the sequence level or above, perhaps to ensure that the pictures in the same layer may share the same sampling grid (e.g., otherwise even temporal prediction performance may be negatively impacted), among other reasons. Syntax elements related to the sampling grid information may be sent at the sequence level, such as but not limited to in the Video Parameter Sets (VPS) and/or Sequence Parameter Sets (SPS), for example.

Figure 8:
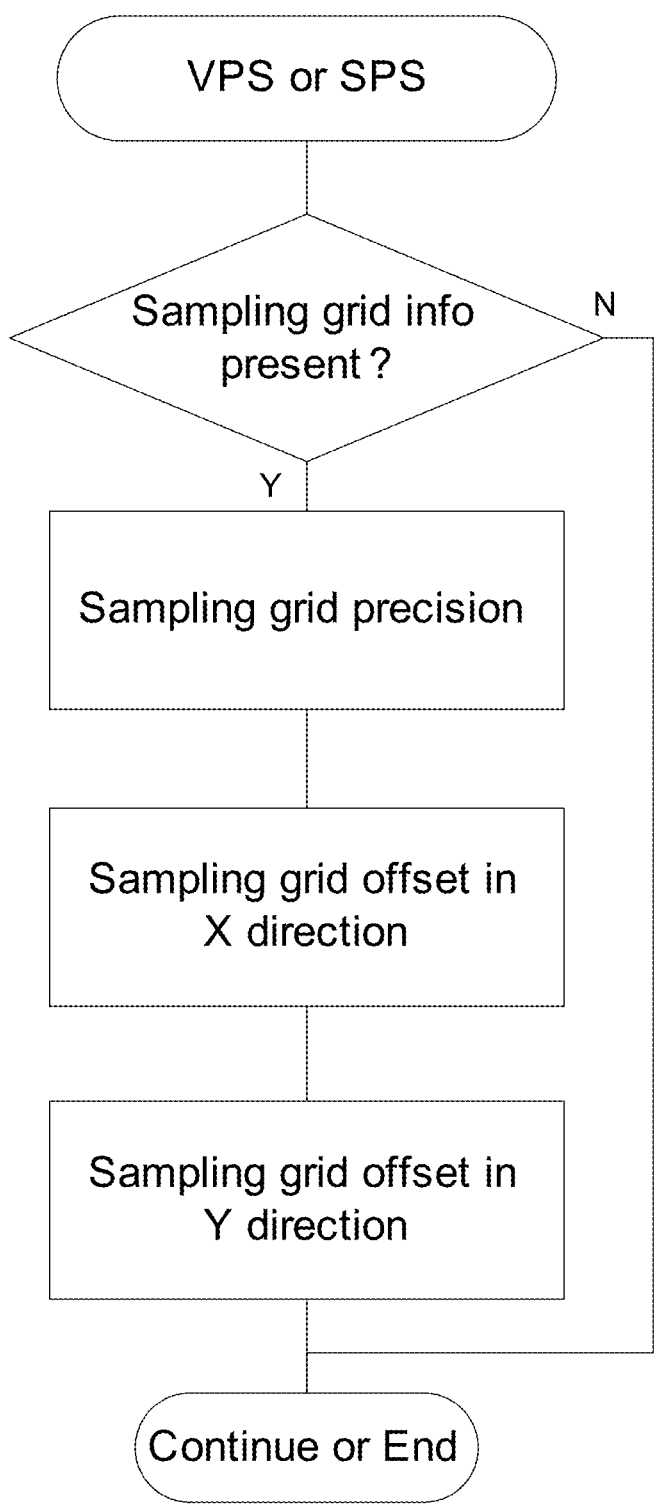
FIG. 8 shows an example flow diagram for signaling of sampling grid information (e.g., video parameter set(s) (VPS) and/or sequence parameter set(s) (SPS)), consistent with embodiments.

FIG. 8 shows a flow chart for an example signaling of sampling grid information. As illustrated in FIG. 8, a flag may be sent to indicate whether sampling grid information is present. In some embodiments, perhaps if such information might not be present, among other reasons, a default sampling grid may be assumed. For example, the default may indicate that the sampling grids of the up-sampled base layer and/or the enhancement layer may be aligned (e.g., zero phase shift between the two grids). In some embodiments, perhaps if the flag may indicate that sampling grid information is present, among other reasons, the precision of the sampling grid information may be signaled, which may be followed by the actual sampling grid alignment information for the X and/or the Y dimension (e.g., a sampling grid offset in the X direction (or a first direction, such as but not limited to a horizontal direction) and/or a sampling grid offset in the Y direction (or a second direction, such as but not limited to a vertical direction)). In some embodiments, the techniques may be applied to a data set (e.g., a set of data or data) that may include a VPS and/or SPS, for example. None of the individual elements described in regard to the flowchart in FIG. 8 are either necessary or essential, and any of the elements may be performed in any order, or in any combination.

In the example of FIG. 7, the sampling grid alignment (and/or amount and/or degree of alignment) between the up-sampled base layer and the enhancement layer may be signaled in one-fourth pixel precision (which in some embodiments may by measured in terms of an enhancement layer (EL) sampling grid), for example, (among other contemplated precisions, including other fractional pixel precisions). In some embodiments, a value (e.g., "+2") may be signaled for the offset in one or more, or each, dimension (e.g., to indicate that the relative sampling grids are off by one-half pixels to the right and/or by one-half pixels down). Though not shown in the example of FIG. 7, the relative sampling grids between the up-sampled BL and the EL may be off in one or both directions (e.g., a first direction and/or a second direction). That is, relative to the EL grid, the up-sampled BL grid may be to the left or to the right in the X dimension, and/or above or below in the Y dimension. In some embodiments, the X and Y sampling grid offsets in FIG. 8 may be signed values, unsigned integer values, or a combination of both signed and unsigned integer values. The relative sampling grid between the up-sampled BL and the EL video may be off by less than ±1 full pixel, for example. In some embodiments, the offset precision in a first dimension (e.g., X dimension) and in a second dimension (e.g., Y dimension) may be the same or substantially similar. In some embodiments, the offset precision in the X dimension and in the Y dimension may be different. In one or more embodiments, the offset precision in the X dimension and/or in the Y dimension may be signaled together or separately.

Figure 9:
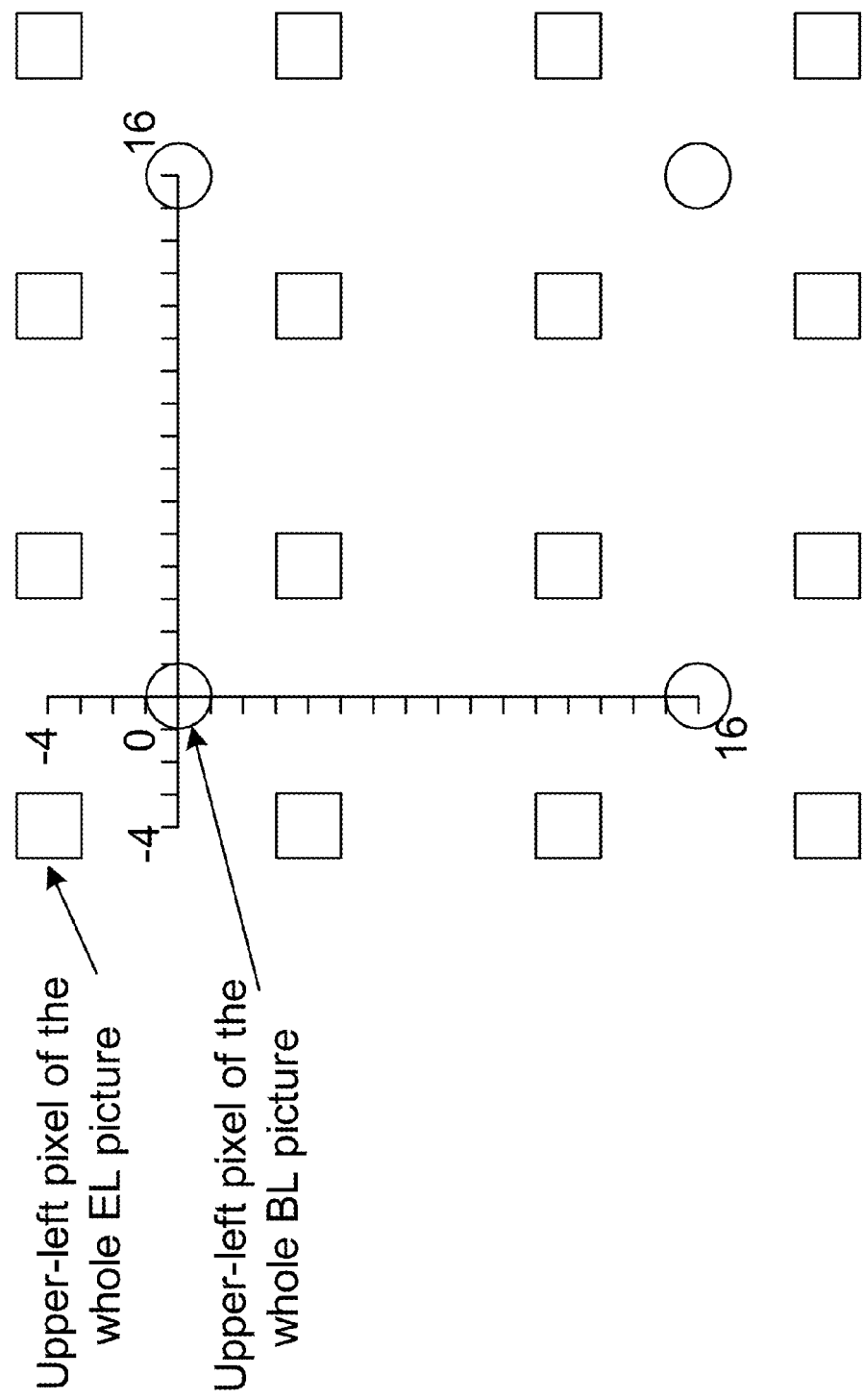
FIG. 9 shows an example for signaling sampling grid information, consistent with embodiments.

Sampling grid information may be signaled (e.g., in a video or on a display). In the examples of FIGS. 5A, 5B, 6A, and 6B, the BL and EL sampling grids are overlaid, for example to illustrate how the relative sampling grid information may be signaled. The precision may be measured in terms of a BL sampling grid. As shown in FIG. 9, the distance of two neighboring BL pixels may be divided (e.g., evenly) into 16 segments. One or more, or each, segment may represent 1/16-pixel unit of precision, for example. Other precisions may be implemented. The relative positions of the pixels in the BL and EL pictures may be examined and the sampling of grid offsets may be determined. The relative positions that may be examined may include the upper-left pixels in BL and EL pictures. The sampling grid offset in the horizontal direction may be determined using Equation (1). The sampling grid offset in the vertical direction may be determined using Equation (2).

$$\text{sampling\_grid\_offset\_hori} = \text{position\_BL\_hori} - \text{position\_EL\_hori} \quad \text{Equation (1)}$$

$$\text{sampling\_grid\_offset\_vert} = \text{position\_BL\_vert} - \text{position\_EL\_vert} \quad \text{Equation (2)}$$

The position_BL_hori and position_EL_hori may include the horizontal positions of the upper-left pixels in the BL and EL pictures, respectively. The position_BL_ vert and position_EL_vert may include the vertical positions of the upper-left pixels in the BL and EL pictures, respectively. In FIG. 9, the sampling grid offsets sampling_grid_offset_hori and sampling_grid_offset_vert may be equal to 4, with 1/16-pixel precision. In some embodiments, perhaps if the BL and EL sampling grids may be aligned, as shown in FIG. 5A and FIG. 6A, for example, among other scenarios, the sampling grid offsets may include the default values of zero.

The sampling grid offset may be determined for luma and/or chroma planes. A pair of sampling grid offsets (e.g., sampling_grid_offset_hori and sampling_grid_offset_vert) may be signaled for one or more, or each, of the luma and/or chroma planes. The relative grids of the luma and chroma planes in a video sequence may be predetermined and/or fixed. The relative grids may be fixed since the video sequence may include the standardized color subsampling format, such as 4:2:0, 4:2:2, and/or 4:4:4 for example. The sampling grid offsets for chroma planes may be derived according to the sampling grid offsets for the luma plane. In some embodiments, perhaps when the sampling grid offsets for chroma planes may be derived according to the sampling grid offsets for the luma plane, among other reasons, the sampling grid offsets for the chroma planes may be determined without explicit signaling. The derivation process may be performed as described herein.

TABLE 2

Example of signaling sampling grid information

| sampling_grid_information( ) { | Descriptor |
|---|---|
| sampling_grid_info_present_flag | u(1) |
| if ( sampling_grid_info_present_flag ) { | |
|   log2_sampling_grid_precision | ue(v) |
|   sampling_grid_abs_offset_x | u(v) |
|   sampling_grid_abs_offset_y | u(v) |
|   sampling_grid_sign_x | u(1) |
|   sampling_grid_sign_y | u(1) |
|   chroma_sampling_grid_info_presented_flag | u(1) |
|   if (chroma_sampling_grid_info_presented_flag ) { | |
|     log2_chroma_sampling_grid_precision | ue(v) |
|     chroma_sampling_grid_abs_offset_x | u(v) |
|     chroma_sampling_grid_abs_offset_y | u(v) |
|     chroma_sampling_grid_sign_x | u(1) |
|     chroma_sampling_grid_sign_y | u(1) |
|   } | |
| } | |

Table 2 illustrates an example syntax table for signaling the sampling grid information (e.g., in the segment of syntax elements illustrated herein). One or more of the semantics are further described herein. The sampling_grid_info_presented_flag may be equal to 1 and/or may indicate that sampling grid information can be (or in some embodiments, perhaps will be) presented in the following bitstream. The sampling_grid_info_presented_flag may be equal to 0 and/or may indicate that sampling grid information might not (or in some embodiments, perhaps will not) be presented. The sampling_grid_info_presented_flag may indicate that the BL and EL sampling grids are aligned and/or that the offset is set to the default value of zero, perhaps when the sampling_grid_info_presented_flag may indicates that the sampling grid information might not be (or in some embodiments perhaps will not be) presented, for example. The log 2_sampling_grid_precision may indicate the precision of the sampling grid. For example, the precision of the sampling grid may be determined by SamplingGridPrecision= $2^{log\ 2\_sampling\_grid\_precision}$.

The sampling_grid_abs_offset_x may indicate the absolute value of the sampling grid offset in the horizontal direction. The sampling_grid_abs_offset_x may be fixed-length coded. The code length may be equal to log 2_sampling_grid_precision.

The sampling_grid_abs_offset_y may indicate the absolute value of the sampling grid offset in the vertical direction. The sampling_grid_abs_offset_y may be fixed-length coded. The code length may be equal to log 2_sampling_grid_precision.

The sampling_grid_sign_x may indicate the sampling grid offset in the horizontal direction. The sampling_grid_sign_x being equal to 0 may indicate that the sampling grid offset in the horizontal direction is positive. The sampling_grid_sign_x being equal to 1 may indicate that the sampling grid offset in the horizontal direction is negative.

The sampling_grid_sign_y may indicate the sampling grid offset in the vertical direction. The sampling_grid_sign_y being equal to 0 may indicate that the sampling grid offset in the vertical direction is positive. The sampling_grid_sign_y being equal to 1 may indicate that the sampling grid offset in the vertical direction is negative.

The sampling grid offset in the horizontal direction may be indicated by the SamplingGridOffsetX. The SamplingGridOffsetX may be determined by SamplingGridOffsetX=(1−sampling_grid_sign_x*2)*sampling_grid_abs_offset_x. The sampling grid offset in the vertical direction may be indicated by the SamplingGridOffsetY. The SamplingGridOffsetY may be determined by SamplingGridOffsetY=(1−sampling_grid_sign_y*2)*sampling_grid_abs_offset_y.

Chroma sampling grid information may be indicated by chroma_sampling_grid_info_presented_flag. The chroma_sampling_grid_info_presented_flag being equal to 1 may indicate that chroma_sampling grid information may be (or in some embodiments perhaps will be) presented in the following bitstream. The chroma_sampling_grid_info_presented_flag being equal to 0 may indicate that no chroma sampling grid information might be (or in some embodiments perhaps will be) presented. In the latter case, perhaps if sampling_grid_info_presented_flag is equal to 1, among other reasons, the chroma sampling grid offsets may be derived according to the offsets for luma, for example. Perhaps if sampling_grid_info_presented_flag is equal to 0, among other reasons, the chroma sampling grid offsets may be set to the default value 0, for example.

The log 2_chroma_sampling_grid_precision may indicate the precision of the chroma sampling grid, as described herein for example. The ChromaSamplingGridPrecision may be determined by ChromaSamplingGridPrecision= $2^{log\ 2\_chroma\_sampling\_grid\_precision}$. The chroma_sampling_grid_abs_offset_x may indicate the absolute value of the chroma sampling grid offset in the horizontal direction. The chroma_sampling_grid_abs_offset_x may be fixed-lengh coded. The code length may be equal to log 2_chroma_sampling_grid_precision. The chroma_sampling_grid_abs_offset_y may specify the absolute value of the chroma sampling grid offset in the vertical direction. The chroma_sampling_grid_abs_offset_y may be fixed-length coded. The code length may be equal to log 2_chroma_sampling_grid_precision.

The chroma_sampling_grid_sign_x may indicate the chroma sampling grid offset in the horizontal direction. The chroma_sampling_grid_sign_x being equal to 0 may indicate that the chroma sampling grid offset in the horizontal direction is positive. The chroma_sampling_grid_sign_x being equal to 1 may indicate that the chroma sampling grid offset in the horizontal direction is negative.

The chroma_sampling_grid_sign_y may indicate the chroma sampling grid offset in the vertical direction. The chroma_sampling_grid_sign_y being equal to 0 may indicate that the chroma sampling grid offset in the vertical direction is positive. The chroma_sampling_grid_sign_y being equal to 1 may indicate that the chroma sampling grid offset in the vertical direction is negative.

The chroma sampling grid offset in the horizontal direction may be indicated by ChromaSamplingGridOffsetX. The ChromaSamplingGridOffsetX may be determined by ChromaSamplingGridOffsetX=(1−chroma_sampling_grid_sign_x*2)*chroma_sampling_grid_abs_offset_x.

The chroma sampling grid offset in the vertical direction may be indicated by ChromaSamplingGridOffsetY. The ChromaSamplingGridOffsetY may be determined by ChromaSamplingGridOffsetY=(1−chroma_sampling_grid_sign_y*2)*chroma_sampling_grid_abs_offset_y.

The syntax and semantics described herein are provided as examples. Alternative, or additional, embodiments may be implemented for coding the sampling grid information. The variable length coding may be applied to code the sampling grid offsets. The chroma sampling grid information may be directly derived based on the luma sampling grid information and/or the chorma format information. In some embodiments, one or more, or each, of the chroma_sampling_grid_info_present_flag, log 2_chroma_sampling_grid_precision, chroma_sampling_grid_abs_offset_x, chroma_sampling_grid_abs_offset_y, chroma_sampling_grid_sign_x, and/or chroma_sampling_grid_sign_y in Table 2 may be skipped.

In one or more embodiments, the sampling grid information sampling_grid_information( ) in Table 2 may be signaled as part of the Sequence Parameter Set (SPS), as shown in Table 2A for example. The sampling grid information may be signaled in the Video Parameter Sets (VPS). The VPS may include an extension vps_extension( ) which may be used to specify high level information about the scalable bitstream, such as the layer dependency information between different layers for example. As shown in Table 2B, the binary flag direct_dependency_flag[i][j] may be used to indicate whether the current layer "i" uses layer "j" as the reference layer for coding. Perhaps when signaled in VPS, among other scenarios, the relative sampling grid between the current layer and one or more reference layers (e.g., sampling_grid_information(i, j)) may be signaled together with the layer dependency information, for example. The signaling may be performed using the syntax example illustrated in Table 2B.

In one or more embodiments, perhaps even if layer dependency information direct_dependency_flag[i][j] may show that layer "i" depends on reference layer "j" for coding, among other reasons, sampling_grid_information(i, j) may be relevant (and in some embodiments may only be relevant) perhaps when spatial scalability may be applied between layer "i" and layer "j", among other scenarios. In some embodiments, it may be irrelevant perhaps when one or more other scalabilities, such as view scalability and/or SNR scalability for example, among other scenarios, may be used. Embodiments recognize that in the current SHVC design, spatial scalability and/or SNR scalability may not be distinguished in VPS, which may indicate that they may share the same scalability mask value, for example a scalability_mask, as shown in Table 3. In some embodiments, Table 3 may be modified and spatial scalability and SNR scalability may have distinct values, for example as shown in Table 2C. The scalability_mask[i][j] equal to 1 may indicate that the spatial scalability between the current layer "i" and the reference layer "j" is applied (or may be applied). In one or more embodiments, in Table 2C, the element "if (direct_dependency_flag[i] [j])," as shown in Table 2B may be modified as "if (direct_dependency_flag[i] [j] && scalability_mask[i][j]==1)," as shown in Table 2D, such that the sampling grid information sampling_grid_information( ) may be signaled in VPS, perhaps when (and in some embodiments perhaps only when) the current layer "i" uses layer "j" as the reference layer and/or spatial scalability is applied, among other reasons, for example.

TABLE 2A

Example signaling sampling grid information in SPS

| sequence_param_set( ) { | Descriptor |
|---|---|
| sps_video_parameter_set_id | u(4) |
| ...... | |
| sampling_grid_information( ) | |
| ...... | |
| } | |

TABLE 2B

Example signaling sampling grid information in VPS extension

| vps_extension( ) { | Descriptor |
|---|---|
| ...... | |
| for( i = 1; i <= vps_max_layers_minus1; i++ ) | |
| for( j = 0; j < i; j++ ) { | |
| direct_dependency_flag[ i ][ j ] | u(1) |
| if (direct_dependency_flag[ i ] [ j ] ) | |
| sampling_grid_information( i , j ) | |
| } | |

TABLE 2C

Example mapping of ScalabiltyId to scalability dimensions

| scalability_mask index | Scalability dimension | ScalabilityId mapping |
|---|---|---|
| 0 | multiview | ViewId |
| 1 | Spatial scalability | DependencyId |
| 2 | SNR scalability | DependencyId |
| 3-15 | Reserved | |

TABLE 2D

Example signaling sampling grid information in VPS extension

| vps_extension( ) { | Descriptor |
|---|---|
| ...... | |
| for( i = 1; i <= vps_max_layers_minus1; i++ ) | |
| for( j = 0; j < i; j++ ) { | |
| direct_dependency_flag[ i ][ j ] | u(1) |
| if (direct_dependency_flag[ i ][ j ]&& | |
| scalability_mask[i][j] == 1) | |
| sampling_grid_information( i , j ) | |
| } | |

TABLE 3

Example mapping of ScalabiltyId to scalability dimensions

| scalability_mask index | Scalability dimension | ScalabilityId mapping |
|---|---|---|
| 0 | multiview | ViewId |
| 1 | spatial/SNR scalability | DependencyId |
| 2-15 | Reserved | |

In some embodiments, perhaps if the sampling grid information may indicate that there is non-zero relative phase shift between the two spatial layers, among other scenarios, sampling grid correction may be performed to align the sampling grid of the up-sampled BL video with that of the EL video, for example. The corrected signal provided by the alignment may serve as a better prediction for coding of the EL video (e.g., an improved prediction for coding of the EL video as compared to the prediction before and/or without the alignment). In the example of FIG. 7, the phase of the shaded pixels may be corrected such that they may be placed into alignment (and/or be substantially aligned) with the empty squares.

The sampling grid correction may be performed by upsampling and/or filtering. In one or more embodiments, the BL picture may be upsampled using the upsampling filters defined in one or more standards (e.g., normative upsampling). The upsampled BL picture may be filtered using phase-correction filters. One or more poly-phase filters (or phase correction filters) may be used to perform sampling grid correction. For example, a poly-phase filter may be configured as one or more of: a bilinear filter (e.g., that may correspond to the amount of phase shift), a bi-cubic filter, a Lanczos filter, and/or an interpolation filter. Video coding, such as H.264/AVC and/or HEVC video coding for example, may support fractional pixel motion compensation. The interpolation filters that may be used for motion compensation in these systems, such as the 6-tap Wiener filter in H.264/AVC or the DCT-IF in HEVC for example, may be used to correct and/or align the sampling grids. These interpolation filters may be supported by the coding system. In some embodiments, one or more of the aforementioned filters may be used in one or more combinations. In some embodiments, perhaps where interpolation filters may be used for motion compensation, among other scenarios, additional filtering functionalities might not be implemented.

The sampling grid correction may be performed using the sampling grid information described herein. In some embodiments, the upsampling filtering process defined in the scalable extension of HEVC (SHVC) may be used. The sampling grid correction may be performed using 1.5× or 2× spatial scalability and/or 4:2:0 color subsampling format.

Using the upsampling ratio N in the horizontal and vertical directions, the upsampling process may be approximated by interpolating the BL picture to 16 times its size in one or both directions and/or decimating the 16× picture with the ratio M, where 16≈M×N. To perform 16× upsampling, among other reasons, 16-phase interpolation filters may be used. Examples of detailed filter coefficients are provided in Table 4 and Table 5 for luma and for chroma, respectively. Embodiments recognize that SHVC may support 1.5× and/or 2× spatial scalability. A subset of the 16-phase interpolation filters may be described in the scalability extension of HEVC (SHVC) (e.g., as shown in the rows of Table 4 at phase p=0, 5, 8, and 11 and/or in the rows of Table 5 at phase p=0, 4, 5, 6, 8, 9, 11, 14, and 15). Embodiments contemplate that the phase filters that might not be used in the 2× or the 1.5× upsampling process might not be described by SHVC. In one or more embodiments, the luma filters may be 8-tap. In one or more embodiments, the chroma filters may be 4-tap. Also, in one or more embodiments, the luma filters and/or chroma filters may be 2D separable filters.

The 16× interpolation may or might not be performed for one or more, or each, sample. In some embodiments, the samples in the 16× picture that may be kept after decimation may be interpolated. To generate a sample located as (x, y) in the EL picture, among other reasons, the corresponding position (x16, y16) in the virtual 16× picture before decimation may be found by using Equation (3) and/or Equation (4).

$$x16=(x*BLPictureWidth*16+ELPictureWidth/2)/ELPictureWidth \quad \text{Equation (3)}$$

$$y16=(y*BLPictureHeight*16+ELPictureHeight/2)/ELPictureHeight-offset \quad \text{Equation (4)}$$

The (BLPictureWidth, BLPictureHeight) and (ELPictureWidth, ELPictureHeight) may represent picture dimensions of BL and EL pictures, respectively. The dimensions may be of luma or chroma planes, according to which planes the (x16, y16) may be derived for. In Equation (4), offset may be defined as described herein. Perhaps if y16 is calculated for a luma plane, among other scenarios, the offset may be equal to 0. Perhaps if y16 is calculated for a chroma plane and/or the ratio for spatial scalability is be 1.5×, among other scenarios, the offset may be equal to 1. Perhaps if y16 is calculated for a chroma plane and/or the ratio for spatial scalability is 2×, among other scenarios, the offset may be equal to 2.

The sample value at (x16, y16) may be generated by applying the appropriate phase filter to the support region from the BL picture. The index of phase filter for the horizontal direction may be calculated as (x16%16). The index of phase filter for the vertical direction may be calculated as (y16%16). The position of the pixel in BL picture where the phase filter may be anchored may be calculated as (floor (x16/16), floor(y16/16)). The floor(.) function may be used to map a real number to the largest previous integer. In Equation (3) and/or Equation (4), the derivation of (x16, y16) may assume the sampling grids of BL and EL pictures have zero phase shift. The (x16, y16) may be calculated using the sampling grid information signaled in the sequence header, such as VPS and/or SPS for example, and/or using BL and/or EL picture dimension information.

TABLE 4

Example 16-phase luma upsampling filter

| phase | filter coefficients | | | | | | | |
|---|---|---|---|---|---|---|---|---|
| p | $f_L[p, 0]$ | $f_L[p, 1]$ | $f_L[p, 2]$ | $f_L[p, 3]$ | $f_L[p, 4]$ | $f_L[p, 5]$ | $f_L[p, 6]$ | $f_L[p, 7]$ |
| 0 | 0 | 0 | 0 | 64 | 0 | 0 | 0 | 0 |
| 1 | 0 | 1 | −3 | 63 | 4 | −2 | 1 | 0 |
| 2 | 0 | 2 | −6 | 61 | 9 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 4 | −11 | 50 | 29 | −9 | 3 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 3 | −9 | 29 | 50 | −11 | 4 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 9 | 61 | −6 | 2 | 0 |
| 15 | 0 | 1 | −2 | 4 | 63 | −3 | 1 | 0 |

TABLE 5

Example 16-phase chroma upsampling filter

| phase p | filter coefficients | | | |
|---|---|---|---|---|
| | $f_C[p, 0]$ | $f_C[p, 1]$ | $f_C[p, 2]$ | $f_C[p, 3]$ |
| 0 | 0 | 64 | 0 | 0 |
| 1 | −2 | 62 | 4 | 0 |
| 2 | −2 | 58 | 10 | −2 |
| 3 | −4 | 56 | 14 | −2 |
| 4 | −4 | 54 | 16 | −2 |
| 5 | −6 | 52 | 20 | −2 |
| 6 | −6 | 46 | 28 | −4 |
| 7 | −4 | 42 | 30 | −4 |
| 8 | −4 | 36 | 36 | −4 |
| 9 | −4 | 30 | 42 | −4 |
| 10 | −4 | 28 | 46 | −6 |
| 11 | −2 | 20 | 52 | −6 |
| 12 | −2 | 16 | 54 | −4 |
| 13 | −2 | 14 | 56 | −4 |
| 14 | −2 | 10 | 58 | −2 |
| 15 | 0 | 4 | 62 | −2 |

For a luma plane, (x16, y16) may be derived as shown in Equation (5) and/or Equation (6).

$$x16 = (x * BLPictureWidth * 16 + ELPictureWidth/2) / ELPictureWidth - SamplingGridOffsetX \quad \text{Equation (5)}$$

$$y16 = (y * BLPictureHeight * 16 + ELPictureHeight/2) / ELPictureHeight - \text{offset} - SamplingGridOffsetY \quad \text{Equation (6)}$$

For chroma planes, perhaps if sampling grid offsets are presented explicitly (e.g., chroma_sampling_grid_info_presented_flag is equal to 1), among other reasons, (x16, y16) may be derived as shown in Equation (7) and/or Equation (8).

$$x16 = (x * BLPictureWidth * 16 + ELPictureWidth/2) / ELPictureWidth - ChromaSamplingGridOffsetX \quad \text{Equation (7)}$$

$$y16 = (y * BLPictureHeight * 16) / ELPictureHeight - \text{offset} - ChromaSamplingGridOffsetY \quad \text{Equation (8)}$$

For chroma planes, perhaps if sampling grid offsets are not presented explicitly (e.g., chroma_sampling_grid_info_presented_flag is signaled and set to zero, or is not signaled and/or determined to be zero), among other reasons, (x16, y16) may be derived according to the sampling grid offsets for luma, as shown in Equation (9) and/or Equation (10).

$$x16 = (x * BLPictureWidth * 16 + ELPictureWidth/2) / ELPictureWidth - SamplingGridOffsetX/2 \quad \text{Equation (9)}$$

$$y16 = (y * BLPictureHeight * 16) / ELPictureHeight - \text{offset} - SamplingGridOffsetY/2 \quad \text{Equation (10)}$$

The sampling grids may be detected, as described herein for example. The down-sampling process, as shown in FIG. 3 for example, may or might not be a part of the encoder. In some applications, the encoder may receive the higher resolution EL video, perform down-sampling to obtain the lower resolution BL video, and/or apply spatial scalable encoding to both video inputs. The encoder may compare the down-sampling filter phase shift characteristics with the up-sampling filter phase shift characteristics to determine the relative phase shift value, among other reasons. The encoder may directly receive the higher resolution EL video and/or the lower resolution BL video as inputs, for example, perhaps after the down-sampling process has been applied elsewhere in the pipeline, among other scenarios. The phase shift characteristics of the down-sampling filters may be unknown to the encoder and/or the encoder may detect the relative sampling grids.

Figure 10:
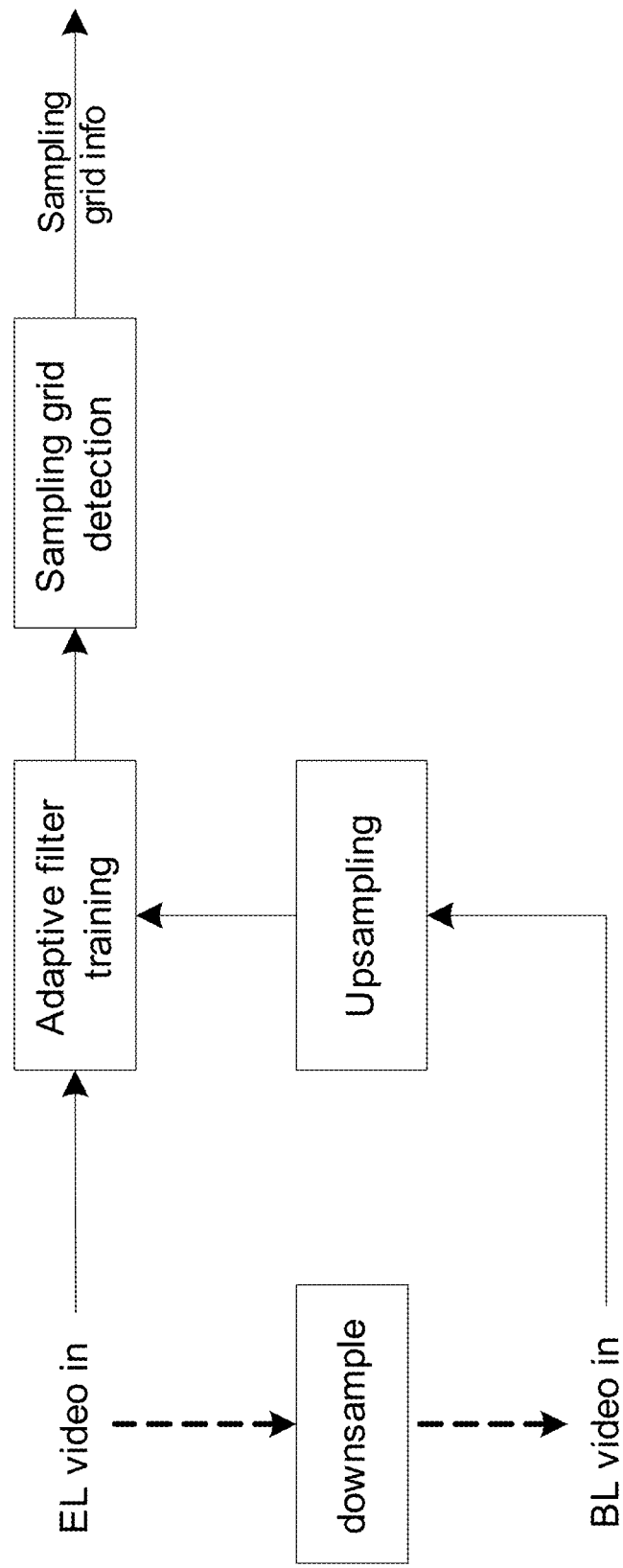
FIG. 10 shows a block diagram for an example detection of a sampling grid (e.g., relative sampling) between spatial layers (e.g., two spatial layers), consistent with embodiments.

FIG. 10 shows an example for using adaptive filter training to detect the relative sampling grids. The BL video may be up-sampled using the up-sampling filter to match the EL video spatial resolution. Adaptive filter training (e.g., a Least Squared linear filter training) may be applied on the EL input and the up-sampled BL input. In some embodiments, the relative phase shift may be detected by examining the one or more adaptive filter coefficients. The adaptive filter coefficients (e.g., those obtained using LS training) may be of floating point precision. In some embodiments, coefficient quantization of at least one of the one or more adaptive filter coefficients may be used to determine where the relative sampling grid position may be according to a predefined fixed precision (e.g., as in FIG. 8). Adaptive filter training may be performed in one or more, or each, dimension separately to detect relative sampling grid in the given dimension, for example, among other reasons.

Figure 11:
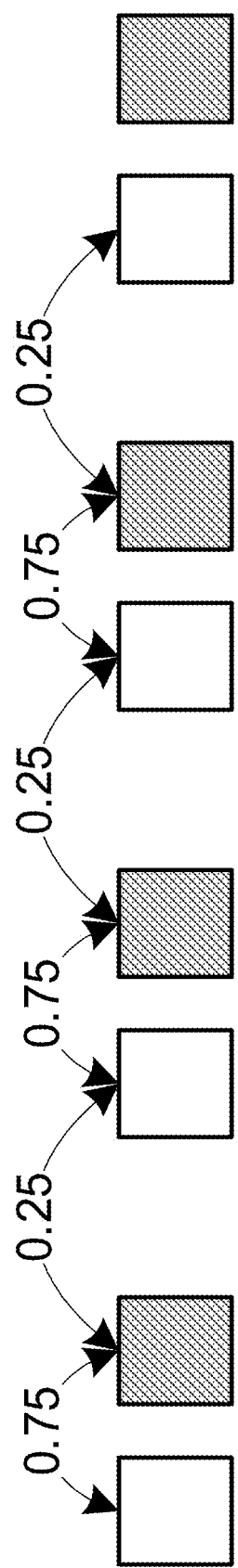
FIG. 11 shows a block diagram that illustrates an example relative sampling grid detection using 2-tap adaptive filter (e.g., X dimension), consistent with embodiments.

Using the X dimension as an example, FIG. 11 shows an example of trained coefficients of an adaptive filter of tap length 2 and the relative sampling grids between the up-sampled BL (patterned squares) and the EL (empty squares) it may correspond to. As described herein, the relative sampling grid information may be fixed throughout the duration of the input video. Detection of the sampling grids may be performed (e.g., at least once) at the beginning of the input video, for example.

Figure 12:
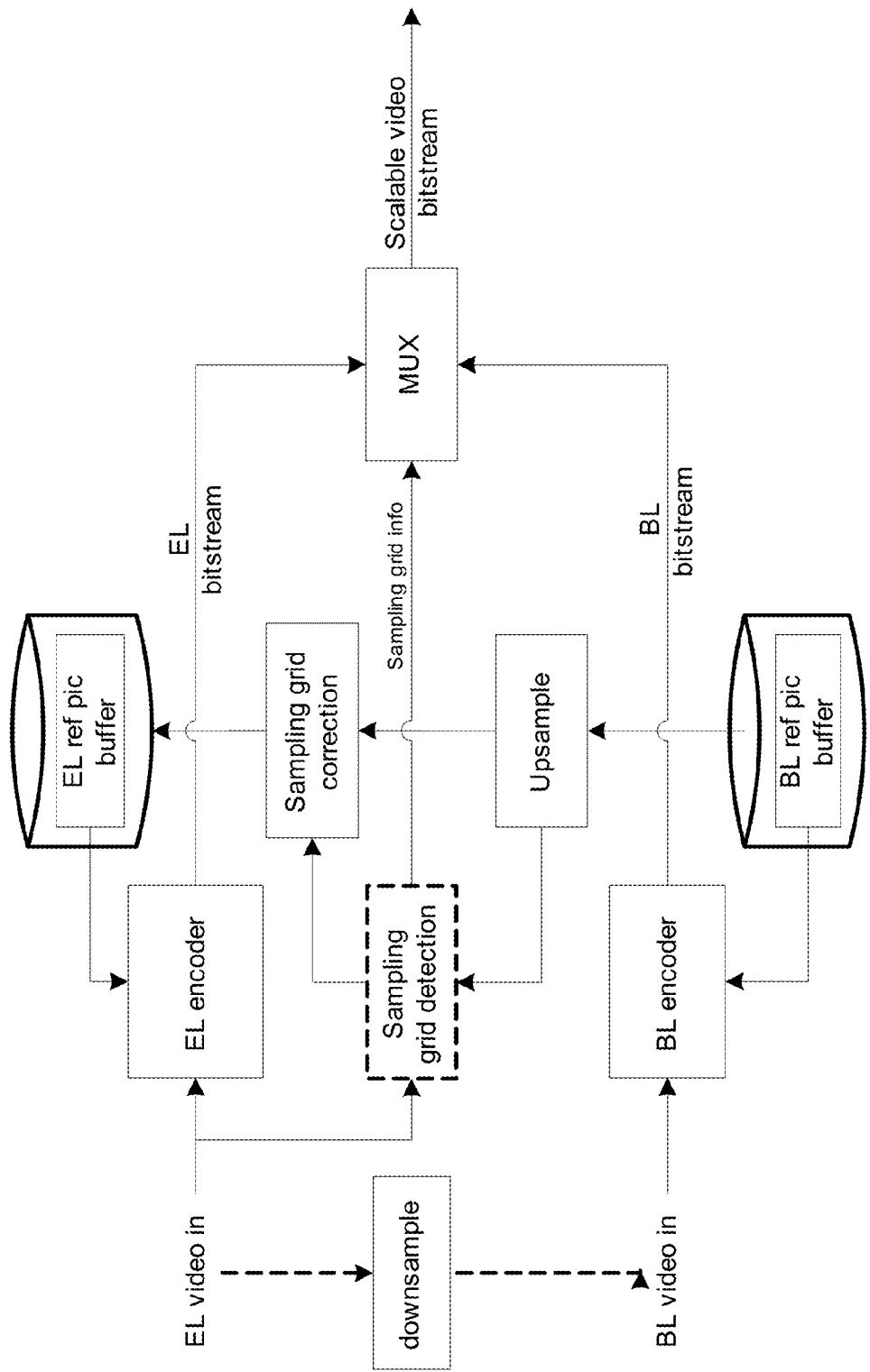
FIG. 12 shows a block diagram of an example multi-layer (e.g., 2 layer) spatial scalable encoding system including sampling grid information signaling, sampling grid correction, and sampling grid detection, consistent with embodiments.

FIG. 12 shows an enhanced 2-layer scalable encoder (e.g., as shown in FIG. 3) that may incorporate one or more of the embodiments described herein, such as sampling grid information signaling, sampling grid correction, and/or sampling grid detection. Though not shown, the scalable decoder illustrated in FIG. 4 may be implemented with one or more of these embodiments in substantially similar manners. While embodiments are described herein with an example 2-layer spatial scalable system, these embodiments may be applicable to spatial scalable systems that support more layers. For example, the embodiments described herein may be applicable to any two spatial layers in a multi-layer system. The layers in an N-layer scalable system may include ($L_0, L_1 \ldots L_{N-1}$), and it may be assumed that ($L_a$, $L_b$) and ($L_a$, $L_d$), $0 \leq a, b, c, d \leq (N-1)$, may be two pairs of spatial layers with different spatial scaling ratios and different relative phase shift characteristics. For example, ($L_a$, $L_b$) may have 1.5× ratio with one-half pixel phase shift. ($L_a$, $L_d$) may have 2× ratio with one-fourth pixel phase shift. The signaling illustrated in FIG. 8 may be expanded to include layer indications, which may be followed by sampling grid information signaling for the particular layers. Since layer dependency information may be signaled in VPS, compared to SPS for example, VPS may be a place to include the layer-specific sampling grid information.

Figure 13A:
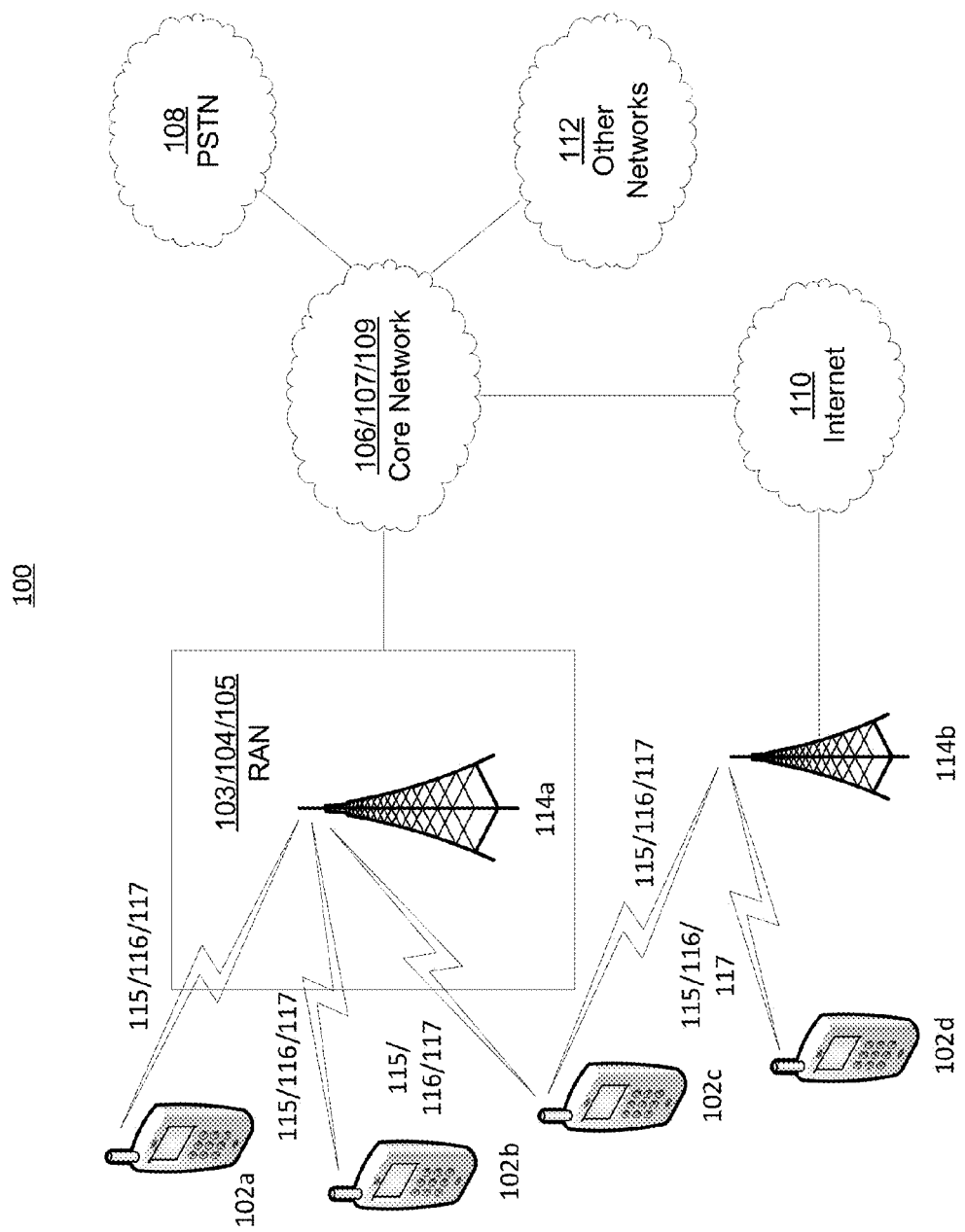
FIG. 13A is a system diagram of an example communications system in which one or more disclosed embodiments may be implemented.

FIG. 13A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 13A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102*b*, 102*c*, 102*d* to facilitate access to one or more communication networks, such as the core network 106/107/109, the Internet 110, and/or the networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 13A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 13A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 13A may be configured to communicate with the base station 114*a*, which may employ a cellular-based radio technology, and with the base station 114*b*, which may employ an IEEE 802 radio technology.

Figure 13B:
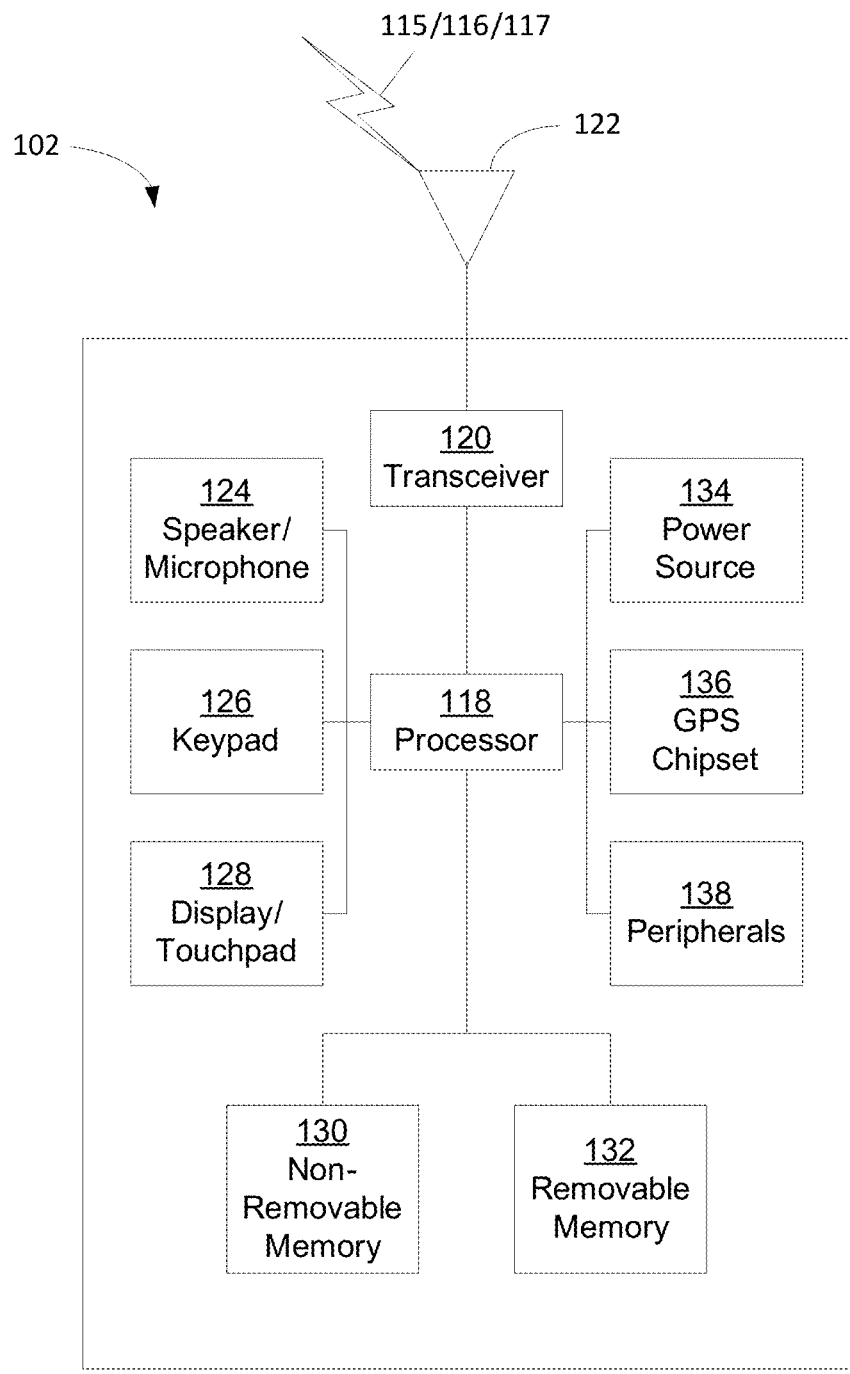
FIG. 13B is a system diagram of an example wireless transmit/receive unit (WTRU) that may be used within the communications system illustrated in FIG. 13A.

FIG. 13B is a system diagram of an example WTRU 102. As shown in FIG. 13B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 13C:
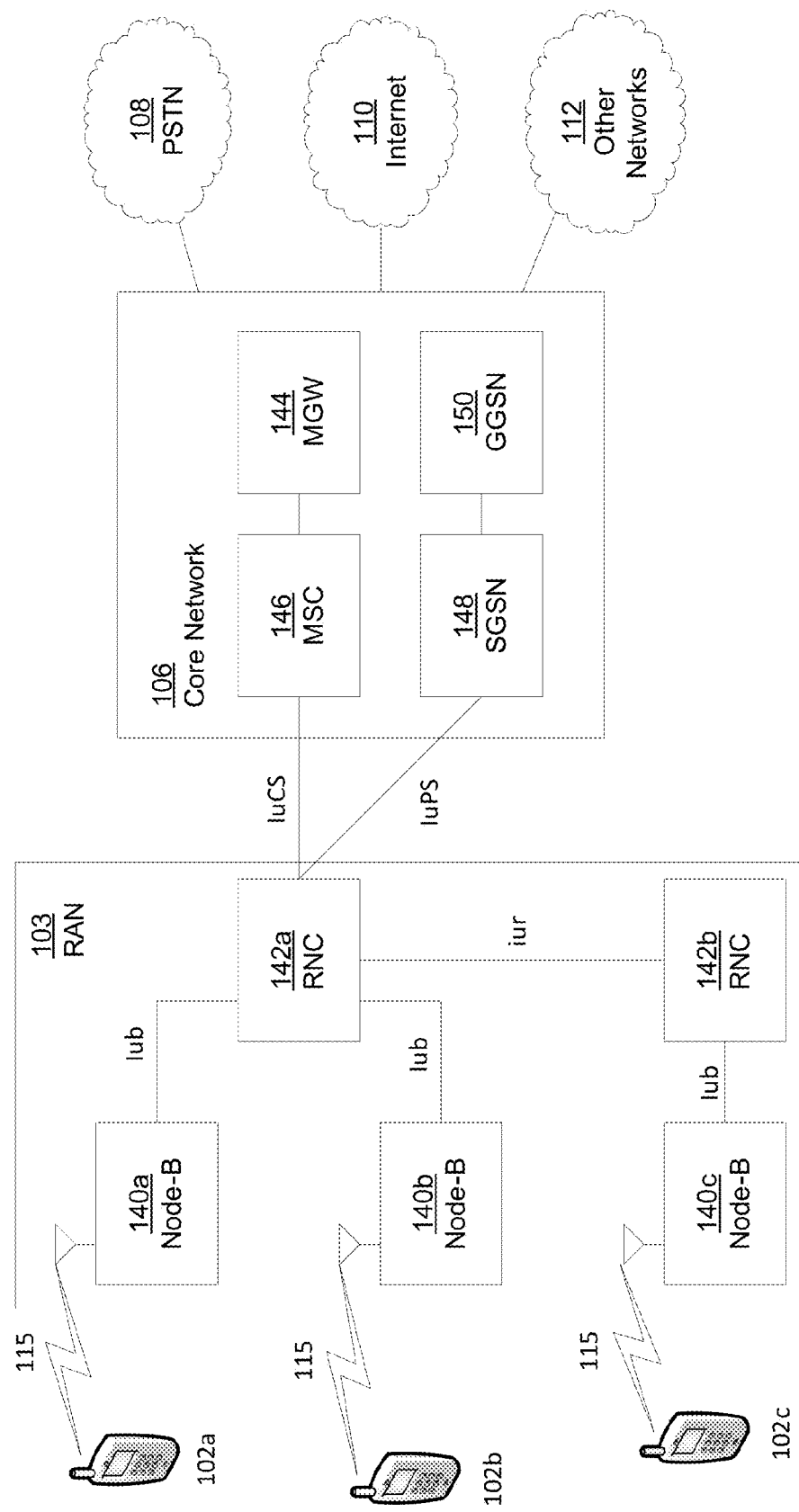
FIG. 13C is a system diagram of an example radio access network and an example core network that may be used within the communications system illustrated in FIG. 13A.

FIG. 13C is a system diagram of the RAN 103 and the core network 106 according to an embodiment. As described herein, the RAN 103 may employ a UTRA radio technology to communicate with the WTRUs 102a, 102b, 102c over the air interface 115. The RAN 103 may also be in communication with the core network 106. As shown in FIG. 13C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 13C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 13C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 13D:
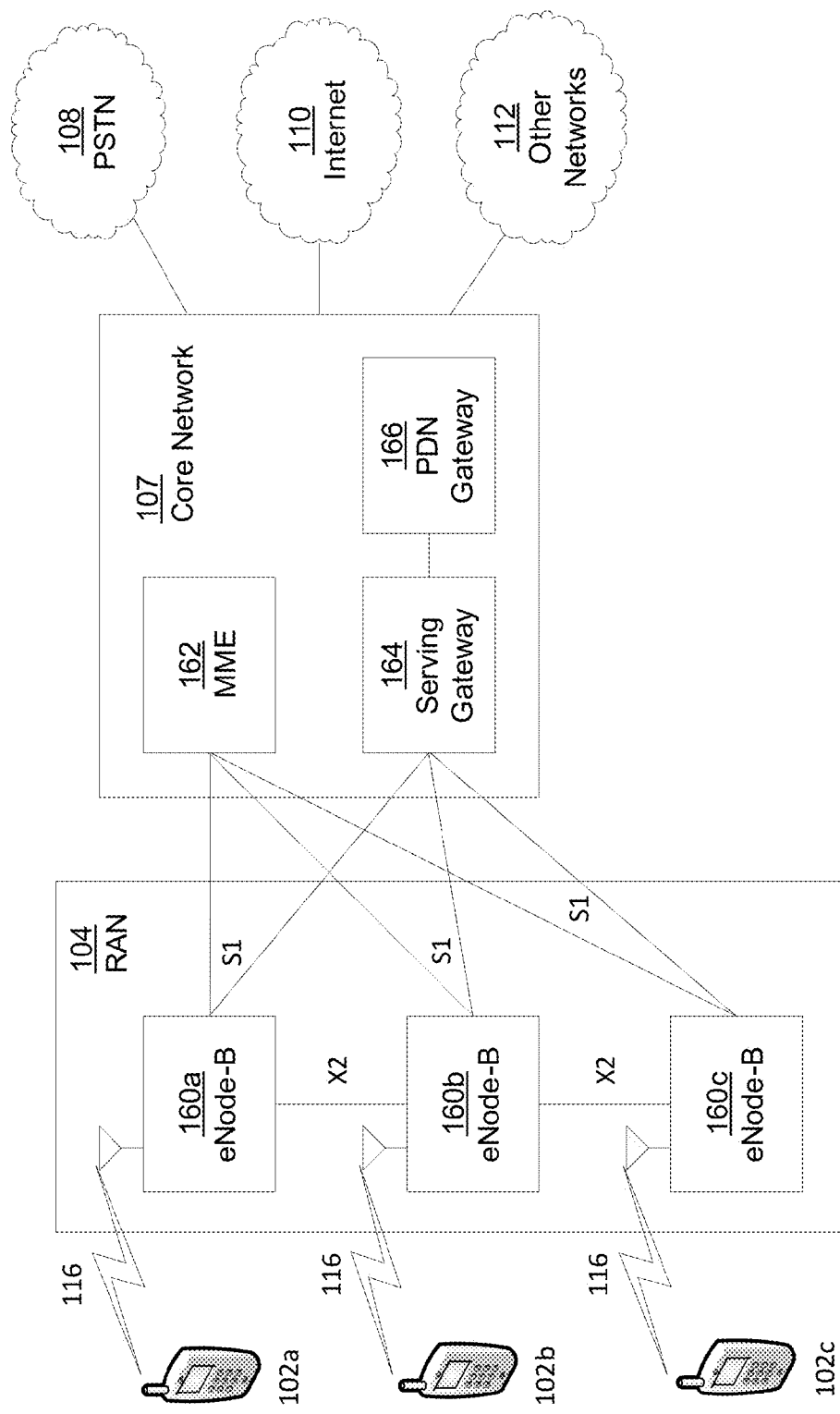
FIG. 13D is a system diagram of another example radio access network and an example core network that may be used within the communications system illustrated in FIG. 13A.

FIG. 13D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 13D, the eNode-Bs 160a, 160b, 160c may communicate with one another over an X2 interface.

The core network 107 shown in FIG. 13D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 13E:
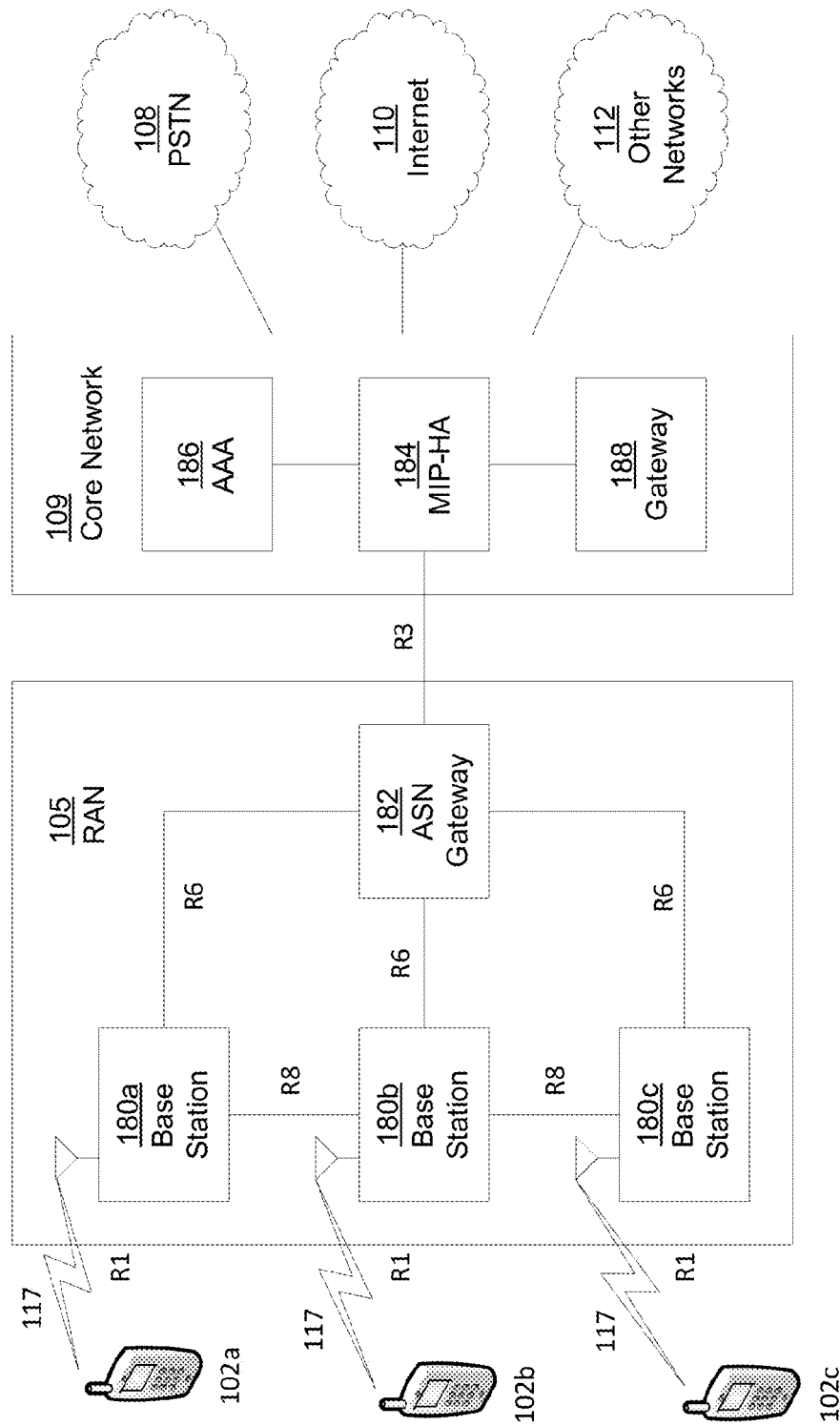
FIG. 13E is a system diagram of another example radio access network and an example core network that may be used within the communications system illustrated in FIG. 13A.

FIG. 13E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 13E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 13E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 13E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The above-referenced communications systems may be used to implement one or more of the embodiments described herein. For example, the communications systems, or portions thereof, may be used to transmit and/or align video data as described herein.

Although features and elements are described above in particular combinations, each feature or element can be used alone or in any combination with the other features and elements. Additionally, while features and elements are described in a particular order, these features and elements are not limited to the order described. Further, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method for multi-layer video coding, the method comprising:
   receiving a signal including sampling grid information, the sampling grid information including luma plane phase shift data and chroma plane phase shift data, the luma plane phase shift data specifying a luma phase shift between a luma sampling grid of a first picture in a first video layer and a luma sampling grid of a second picture in a second video layer, the chroma plane phase shift data specifying a chroma phase shift between a chroma sampling grid of the first picture and a chroma sampling grid of the second picture;
   upsampling the first picture;
   performing sampling grid correction based on the sampling grid information during the upsampling of the first picture;
   selecting one or more High Efficiency Video Coding (HEVC) poly-phase filters based on the chroma plane phase shift data and the luma plane phase shift data, the sampling grid correction including applying the one or more HEVC poly-phase filters;
   aligning the luma sampling grid of the first picture with the luma sampling grid of the second picture based on the sampling grid correction; and
   aligning the chroma sampling grid of the first picture with the chroma sampling grid of the second picture based on the sampling grid correction.

2. The method of claim 1, wherein the chroma plane phase shift data includes at least one of: a horizontal chroma phase shift or a vertical chroma phase shift.

3. The method of claim 1, wherein the luma plane phase shift data includes at least one of: a horizontal luma phase shift or a vertical luma phase shift.

4. The method of claim 1, wherein the signal includes a flag, the flag indicating that the sampling grid information is included in the signal.

5. The method of claim 1, wherein the first video layer is a base layer and the second video layer is an enhancement layer.

6. The method of claim 1, wherein the chroma plane phase shift data and the luma plane phase shift data indicates a non-zero relative phase shift between the first picture in the first video layer and the second picture in the second video layer.

7. A device comprising:
   a receiver configured to receive a signal including sampling grid information, the sampling grid information including luma plane phase shift data and chroma plane phase shift data, the luma plane phase shift data specifying a luma phase shift between a luma sampling grid of a first picture in a first video layer and a luma sampling grid of a second picture in a second video layer, the chroma plane phase shift data specifying a chroma phase shift between a chroma sampling grid of the first picture and a chroma sampling grid of the second picture; and a processor, configured to:
    upsample the first picture;
    perform sampling grid correction based on the sampling grid information during the upsampling of the first picture;
    select one or more High Efficiency Video Coding (HEVC) poly-phase filters based on the chroma plane phase shift data and the luma plane phase shift data, the processor configured to apply the one or more HEVC poly-phase filters as part of the sampling grid correction;
    align the luma sampling grid of the first picture with the luma sampling grid of the second picture based on the sampling grid correction; and
    align the chroma sampling grid of the first picture with the chroma sampling grid of the second picture based on the sampling grid correction.

8. The device of claim 7, wherein the chroma plane phase shift data includes at least one of: a horizontal chroma phase shift or a vertical chroma phase shift.

9. The device of claim 7, wherein the luma plane phase shift data includes at least one of: a horizontal luma phase shift or a vertical luma phase shift.

10. The device of claim 7, wherein the signal includes a flag, the flag indicating that the sampling grid information is included in the signal.

11. The device of claim 7, wherein the chroma plane phase shift data and the luma plane phase shift data indicates a non-zero relative phase shift between the first picture in the first video layer and the second picture in the second video layer.

12. A method for multi-layer video coding, the method comprising:
    receiving a signal including sampling grid information, the sampling grid information including luma plane phase shift data and chroma plane phase shift data, the luma plane phase shift data specifying a luma phase shift between a base layer (BL) picture and an enhancement layer (EL) picture, the chroma plane phase shift data specifying a chroma phase shift between the BL picture and the EL picture;
    selecting one or more High Efficiency Video Coding (HEVC) poly-phase filters based on the chroma plane phase shift data and the luma plane phase shift data; and
    upsampling the BL picture by applying the one or more HEVC polyphase filters to the BL picture, the application of the one or more HEVC polyphase filters comprising:
        aligning a luma sampling grid of the upsampled BL picture with a luma sampling grid of the EL picture; and
        aligning a chroma sampling grid of the upsampled BL picture with a chroma sampling grid of the EL picture.

13. The method of claim 12, wherein the chroma plane phase shift data and the luma plane phase shift data indicate non-zero relative phase shifts in chroma and luma respectively between the BL picture and the EL picture.

\* \* \* \* \*